Jan. 31, 1950     L. C. ROBERTS     2,495,773
ALTERNATING CURRENT TELEGRAPH SYSTEM
Filed Dec. 30, 1942     12 Sheets-Sheet 1

INVENTOR
L. C. ROBERTS
BY R. C. Terry
ATTORNEY

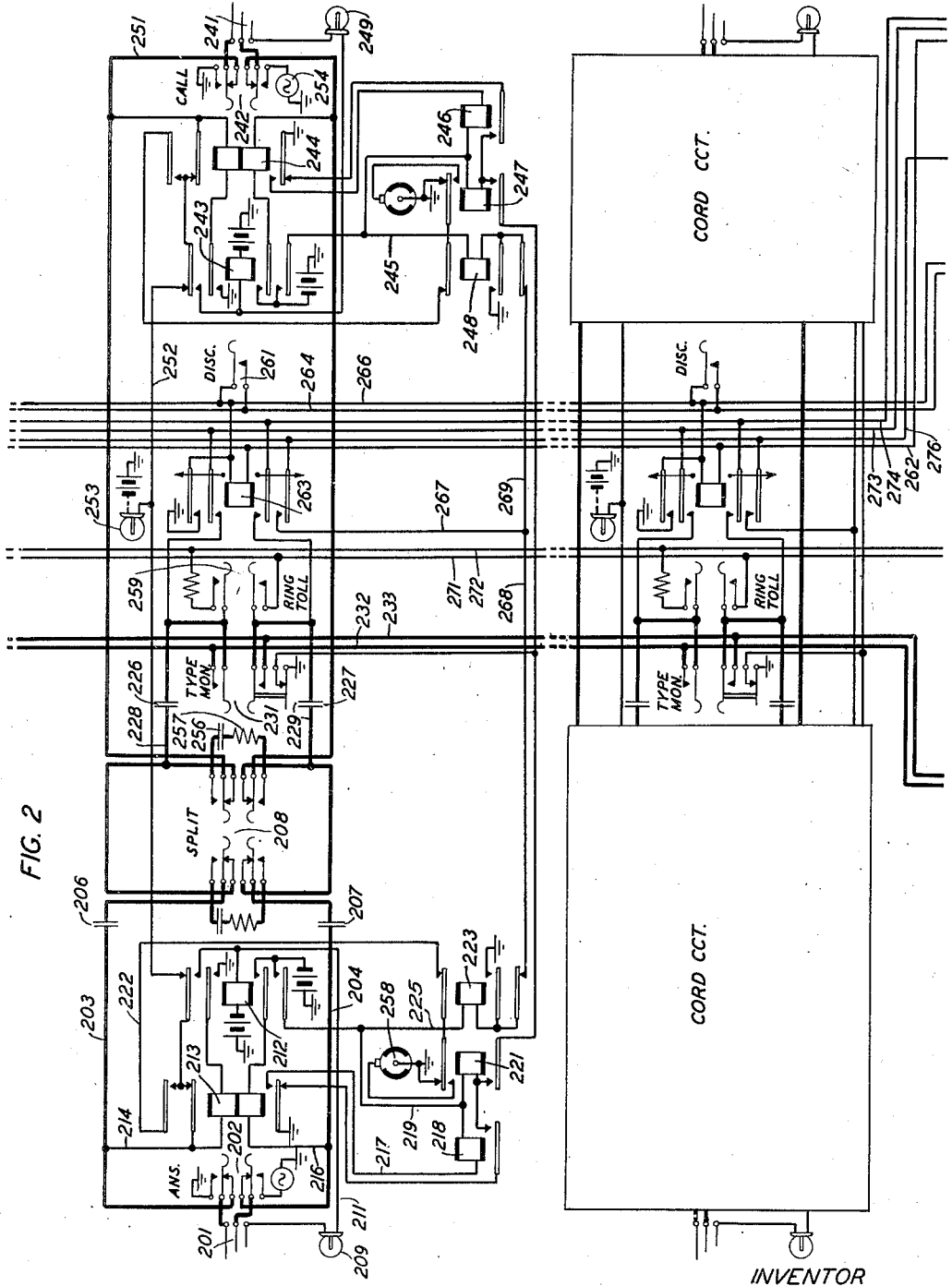

Jan. 31, 1950     L. C. ROBERTS     2,495,773
ALTERNATING CURRENT TELEGRAPH SYSTEM
Filed Dec. 30, 1942     12 Sheets-Sheet 3

INVENTOR
L.C.ROBERTS
BY R.C.Terry
ATTORNEY

Jan. 31, 1950 L. C. ROBERTS 2,495,773
ALTERNATING CURRENT TELEGRAPH SYSTEM
Filed Dec. 30, 1942 12 Sheets-Sheet 5

INVENTOR
L.C. ROBERTS
BY
R.C. Terry
ATTORNEY

INVENTOR
L. C. ROBERTS
BY
R. C. Terry
ATTORNEY

FIG. 9

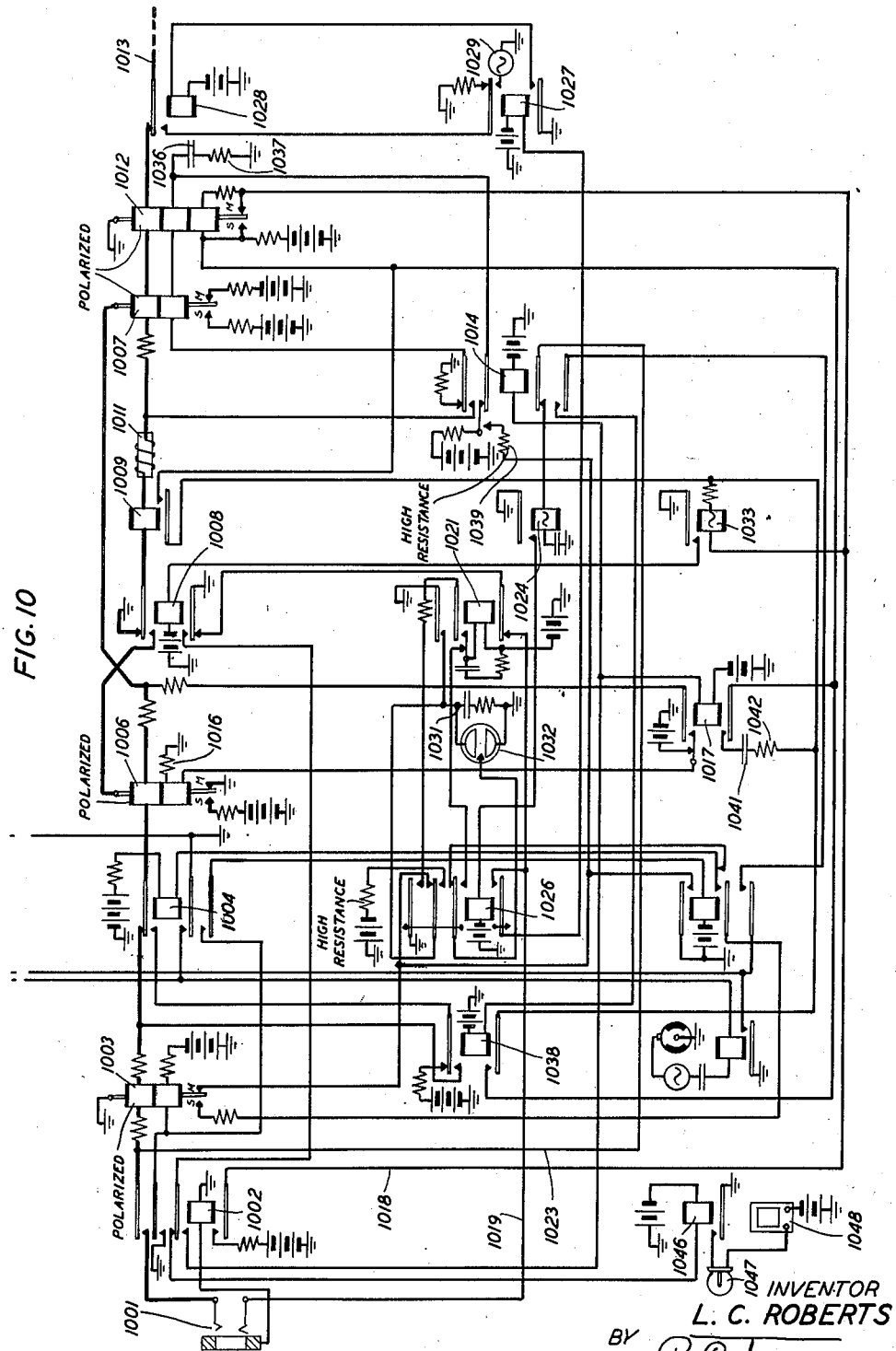

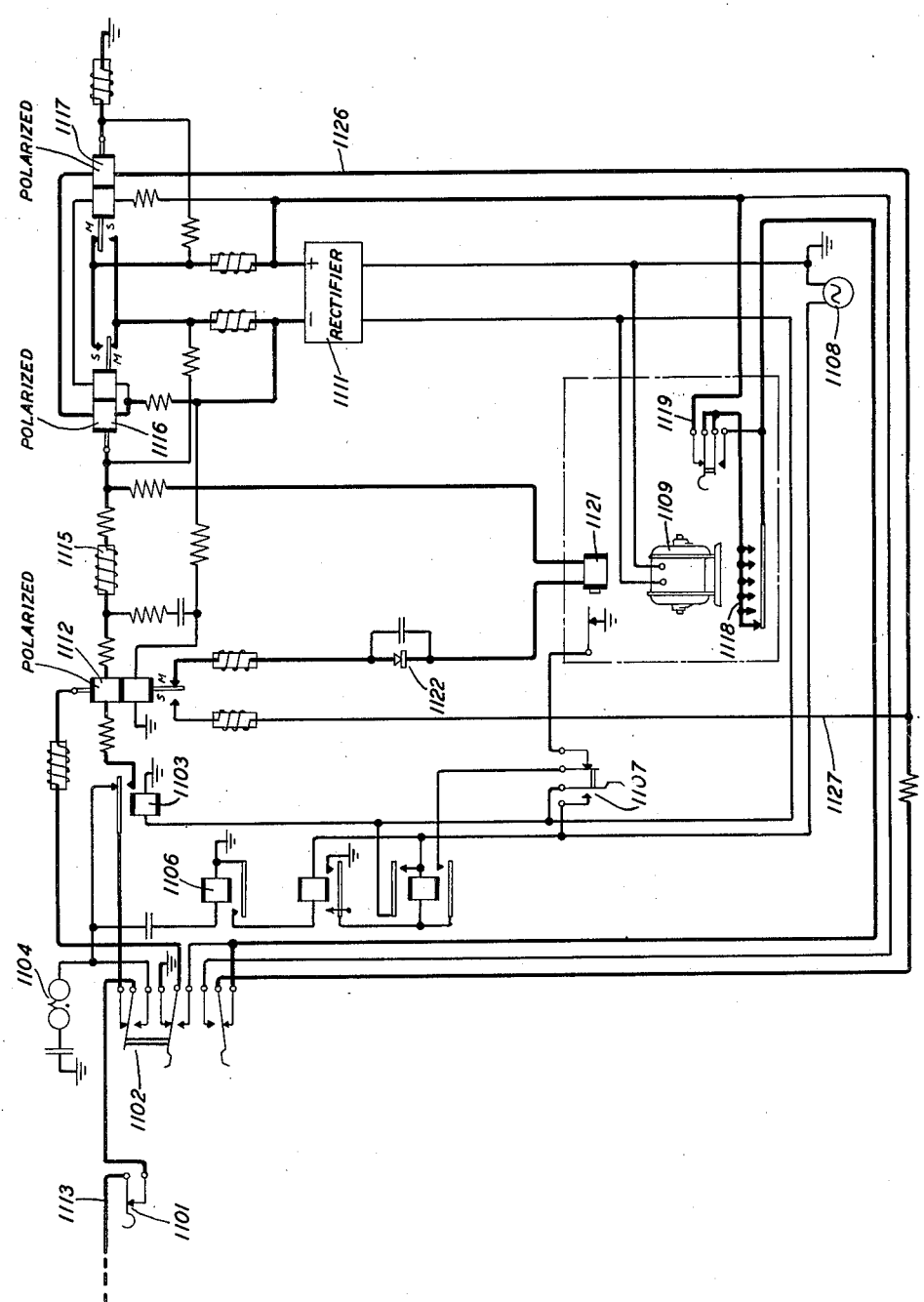

Jan. 31, 1950          L. C. ROBERTS          2,495,773
ALTERNATING CURRENT TELEGRAPH SYSTEM

Filed Dec. 30, 1942          12 Sheets-Sheet 12

INVENTOR
L. C. ROBERTS
BY
R. C. Terry
ATTORNEY

Patented Jan. 31, 1950

2,495,773

UNITED STATES PATENT OFFICE 2,495,773

ALTERNATING CURRENT TELEGRAPH SYSTEM

Leland C. Roberts, Towaco, N. J., assignor to Bell Telephone Laboratories, Incorporated, New York, N. Y., a corporation of New York Application December 30, 1942, Serial No. 470,575

13 Claims. (Cl. 178—2)

This invention relates to printing telegraph apparatus and systems, and particularly to a teletypewriter exchange system.

An object of the invention is to employ alternating current for the transmission of signals between subscribers' stations and central office stations and also between subscribers' stations interconnected through central office stations.

Another object of the invention is to interconnect through a central office switching station, subscribers' stations which transmit and receive alternating current signals and subscribers' stations which transmit and receive direct current signals and to provide for conversion of direct current signals to alternating current signals and alternating current signals to direct current signals in the central office station equipment.

Another object of the invention is to interconnect subscribers' stations equipped for the reception and transmission of alternating current signals over long toll lines which transmit direct current signals with provision for converting from alternating current to direct current signals and from direct current signals to alternating current signals in central office equipments at both ends of the long toll line.

Another object of the invention is to interconnect subscribers' stations equipped to transmit and receive alternating current signals over toll lines arranged to carry alternating current signals.

Another object of the invention is to provide a regenerative repeater for regenerating attenuated or otherwise deteriorated alternating current signals.

The invention features signal level compensation apparatus associated individually with intertoll trunks whereby a substantial saving in apparatus to be installed and maintained is accomplished as contrasted with the provision of signal level compensation apparatus associated with each subscriber's loop, since the number of trunks in a system is usually a small fraction of the number of subscribers' loops served thereby.

The invention also features an arrangement whereby break and other supervisory signals are received and identified in a simple manner.

In accordance with the invention the subscribers' stations are individually provided with a source of alternating current, such as an electron tube oscillator circuit, which generates alternating current at the signaling frequency. The application of trains of alternating current waves to the subscriber's line is controlled by transmitting contacts, and transmitted alternating current as well as received alternating current is amplified by a local amplifier and is rectified for the purpose of operating a printing telegraph receiving recorder which records received messages, and in the case of locally generated signals, produces a home record of those signals. The subscriber's station operates upon a basis of alternating current off for marking signals and on for spacing signals, this arrangement providing for alternating current off at the subscriber's station while signals are being received, so that the receiving amplifier is responsive to received trains of alternating current waves without interference from locally generated alternating current, whereas it would not respond to received trains of alternating current waves separated by no-current intervals if the subscriber's transmitter, in the idle condition, should be applying steady alternating current to the receiving amplifier.

At the central office station, cord circuits arranged to carry alternating current signals between two subscribers' line circuits or between a subscriber's line circuit and a trunk circuit are individually associable by means of keys with an operator's set which is similar to a subscriber's transmitting and receiving set, in that it generates alternating current for signaling, amplifies and rectifies received signals, and also amplifies and rectifies locally generated signals for the operator's home record. The cord circuit has supervisory apparatus at both ends for registering supervisory signals such as recall and disconnect signals.

Connections between subscribers served by different central office stations are established over intertoll trunk circuits extending between the two central office stations. At each end the receiving sides of the trunk circuit are provided with receiving amplifiers which have automatic gain control features. Since the gain of such amplifiers is at maximum when no signal is being received and such amplifiers will then be most sensitive to noise disturbances and also to the beginnings of incoming signals, it is preferable to have the lines interconnecting the central office stations energized by alternating current for the idle or marking condition in order to hold the gain of the receiving amplifiers to normal level. Accordingly, at each end of the trunk in the transmitting side there is a signal conversion circuit for converting current-on spacing signals received from a cord circuit to current-off spacing signals and, conversely, for converting current-off marking signals received from a cord circuit to current-on marking signals. The trunk circuits have supervisory apparatus at each end for registering supervisory signals, such as toll ringing, recall and disconnect signals.

The invention recognizes the desirability of being able to transmit signals originating at and destined for stations equipped to transmit and receive alternating current signals over toll line circuits which are arranged to accommodate only direct current signals and are accordingly equipped with direct current repeater relays. For the accomplishment of this the invention includes an intertoll trunk circuit having signal conversion systems at each end for converting alternating current signals entering the trunk circuit from a cord circuit into direct current signals and for converting direct current signals received over the trunk circuit into alternating current signals to be transmitted into a cord circuit. This alternating current-direct current converting intertoll trunk circuit also has supervisory apparatus at each end for registering supervisory signals.

When alternating current trains of waves are transmitted over long toll lines the signals may become impaired such as by tapering off of the amplitude of the beginnings or ends of the trains of waves, so that the duration of the portions of the trains of waves at effective amplitude may be materially reduced. For the correction of this condition the invention includes a regenerative repeater for alternating current signals which produces trains of alternating current at full amplitude for each received train of alternating current and which has timing means for allotting a full impulse interval to each produced train of alternating current independently of the duration of the portion of the received train which is of effective amplitude.

In order to impart further flexibility to the system, particularly in contemplation of the possibility that a central office station may serve some subscribers' stations that are equipped to transmit and receive alternating current signals and may serve other stations that are equipped to transmit and receive direct current signals, the invention contemplates a cord circuit one end of which is adapted to be connected to a subscriber's station equipped to transmit and receive alternating current signals and the other end of which is adapted to be connected to a subscriber's station equipped to transmit and receive direct current signals. The cord circuit includes means for converting alternating current signals to direct current signals and for converting direct current signals to alternating current signals and has at each end supervisory apparatus for registering supervisory signals originating at the respective alternating current subscriber's station or direct current subscriber's station. The operator's set cooperates with the alternating current portion of the cord circuit so that it also generates and receives alternating current signals and such signals when transmitted to the subscriber's station equipped to transmit and receive direct current signals are converted to such signals.

For a complete understanding of the invention, reference may be had to the following detailed description to be interpreted in the light of the accompanying drawings wherein:

Fig. 2 is a diagrammatic view showing central office station cord circuits for cooperating with the subscribers' line termination circuits and for extending connections to other subscribers' loops or to trunk circuits, one of the cord circuits being shown in full schematic form and the other being represented symbolically;

Figure 4:
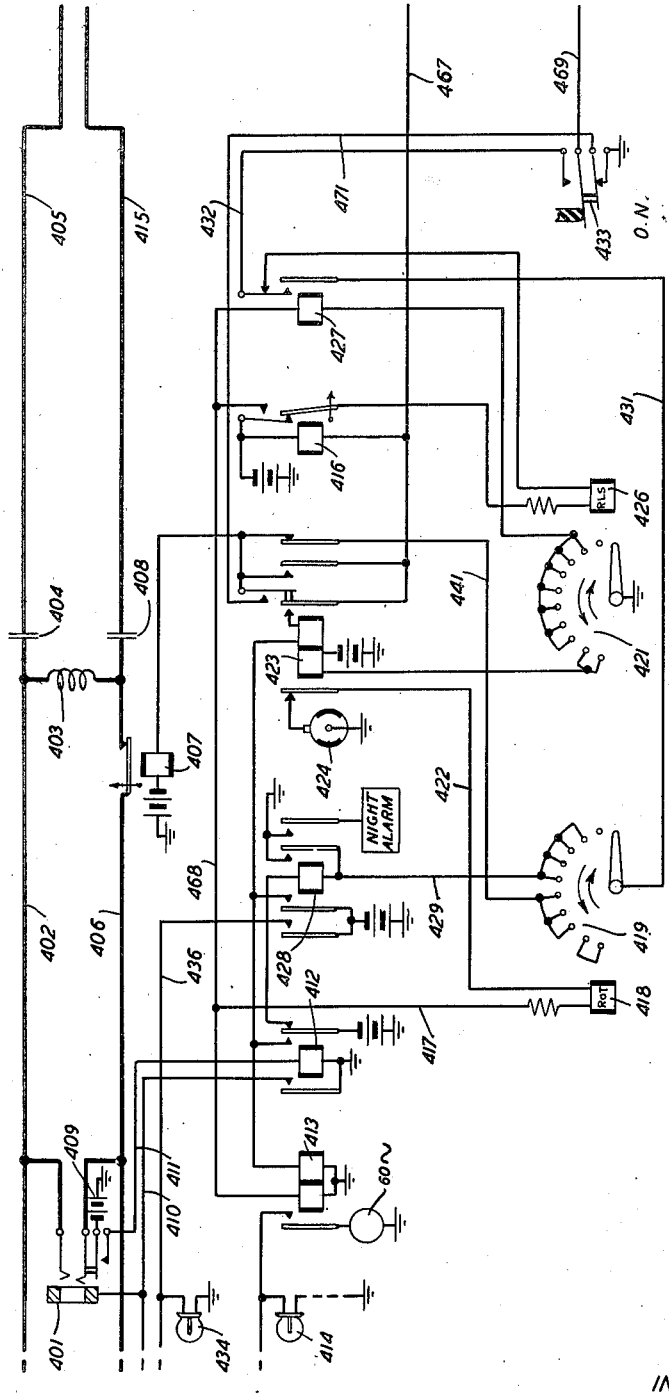
Figure 5:
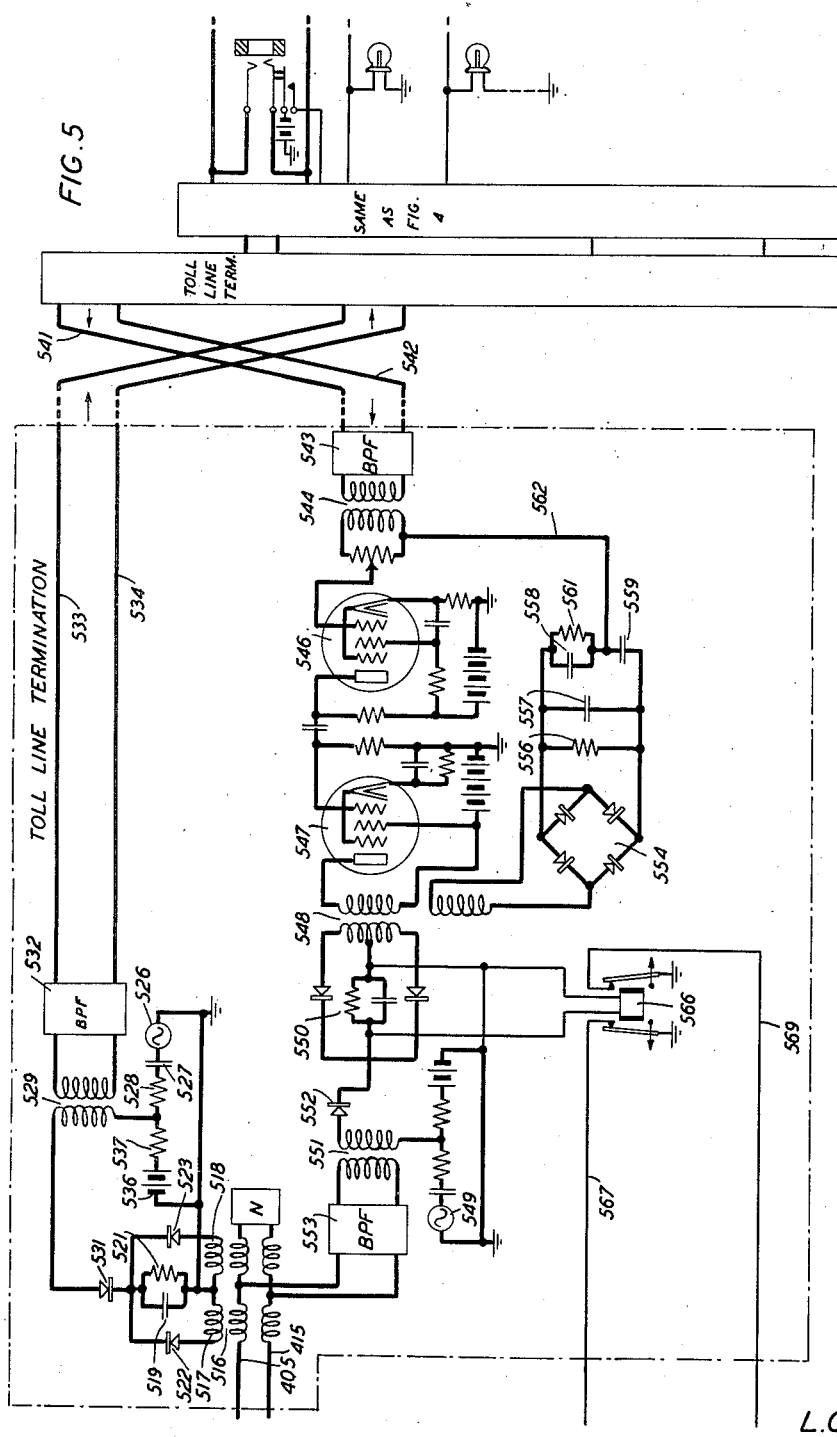
Figure 6:
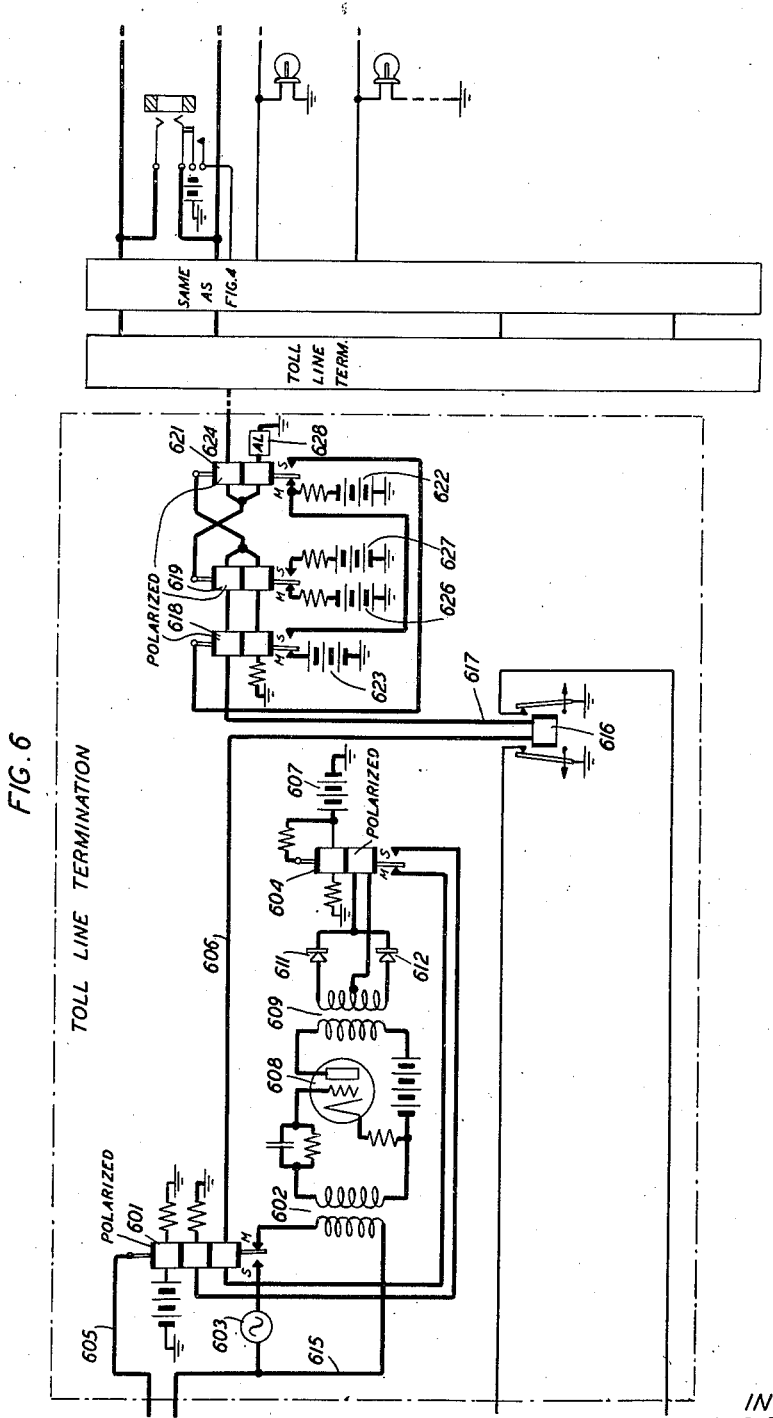
Figure 7:
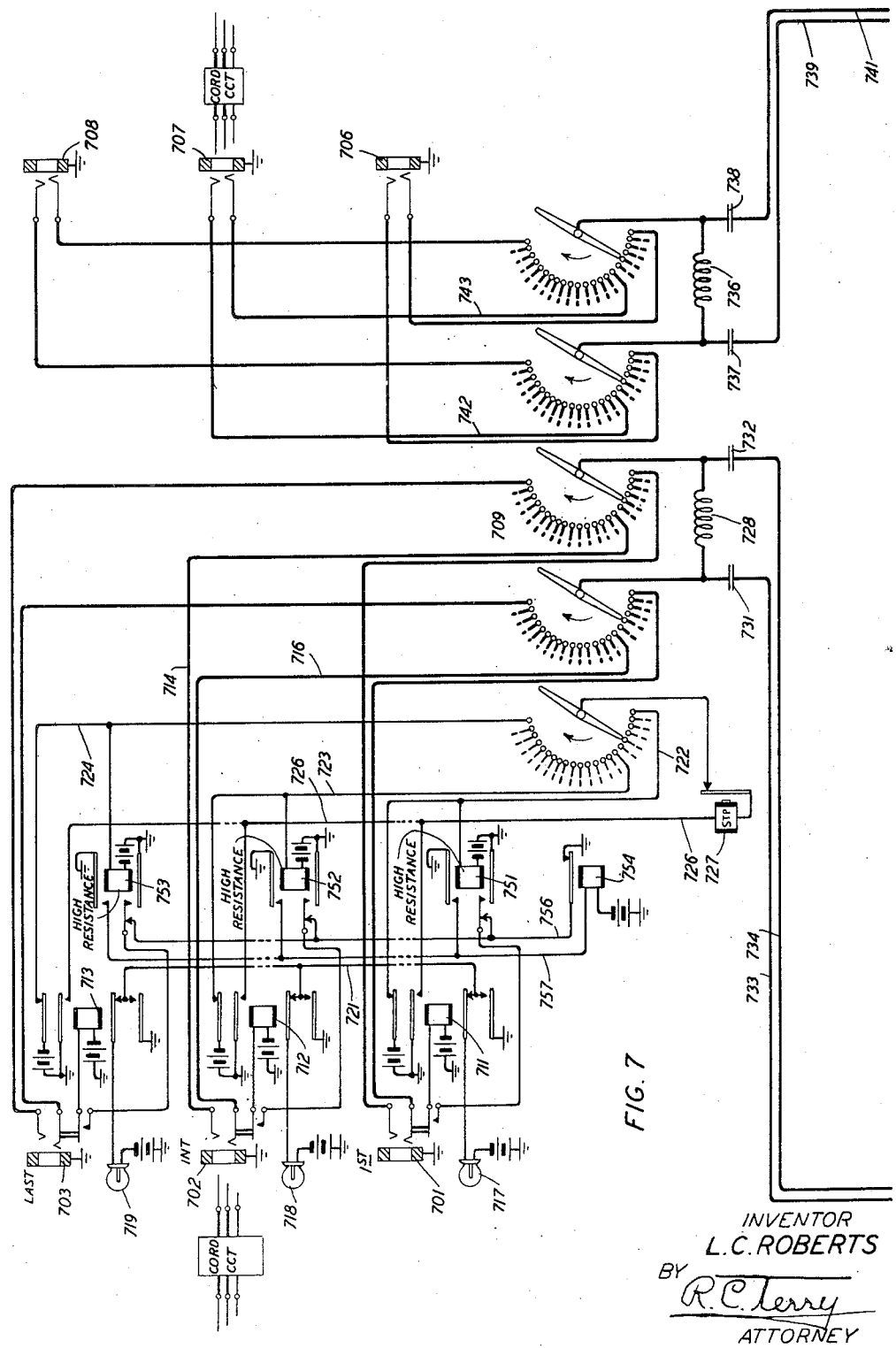
Figure 8:
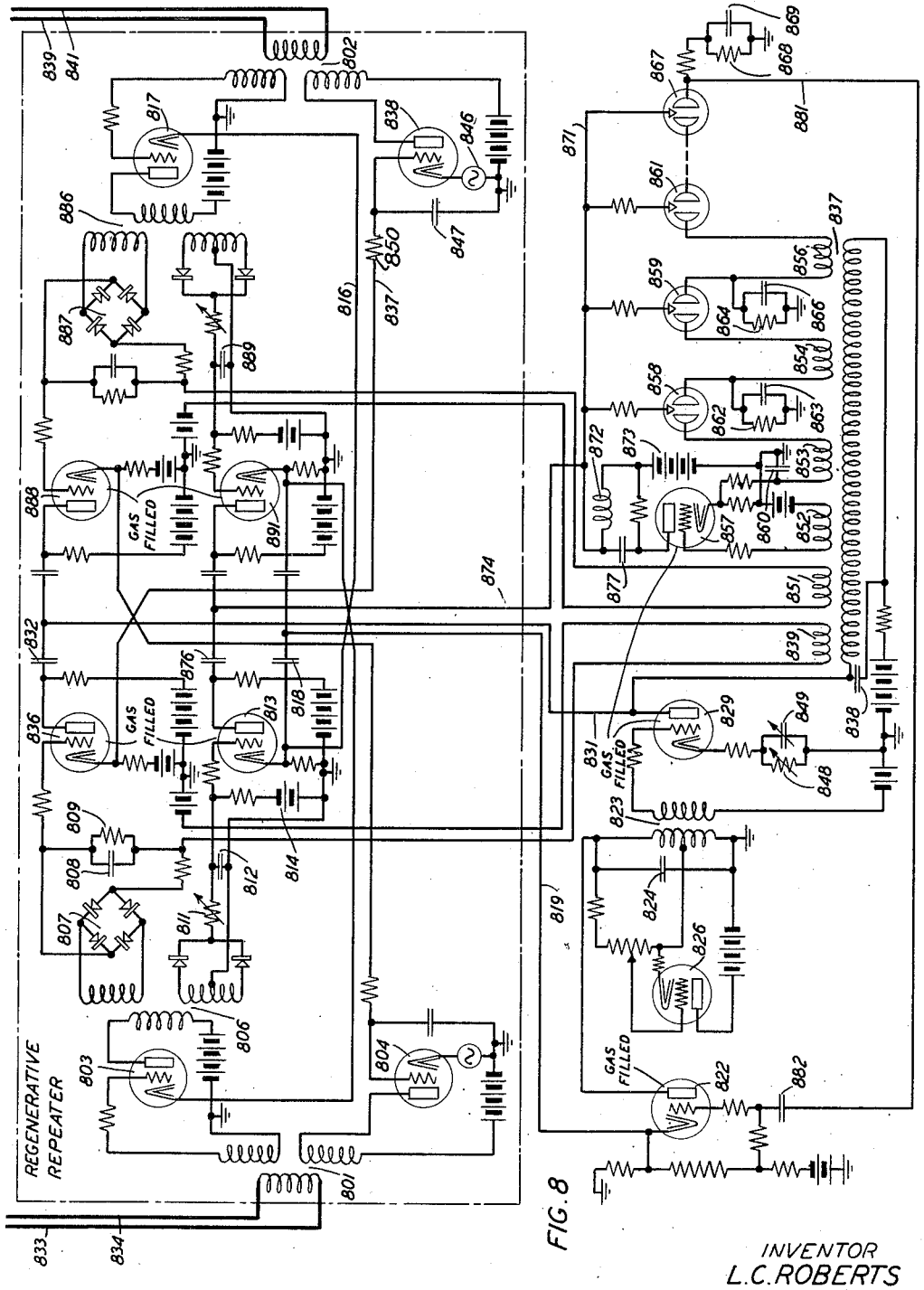

Figs. 4 and 5 when placed side by side with Fig. 5 at the right of Fig. 4 form a diagrammatic view showing an intertoll trunk and relay circuit for extending telegraph circuits over toll lines at the remote ends of which is a similar intertoll trunk and relay circuit;

Fig. 6 in combination with Fig. 4 forms a diagrammatic view showing an intertoll trunk and relay circuit with a conversion feature for extending a connection from a subscriber's station equipped to transmit and receive alternating current signals over a toll line equipped to carry direct current signals, there being at the remote end of the toll line a similar intertoll trunk circuit;

Fig. 7 is a diagrammatic view showing a connector circuit for connecting a regenerative repeater between two communication circuit elements such as cord circuits;

Fig. 8 is a diagrammatic view showing a regenerative repeater for regenerating alternating current signals;

Figure 9:
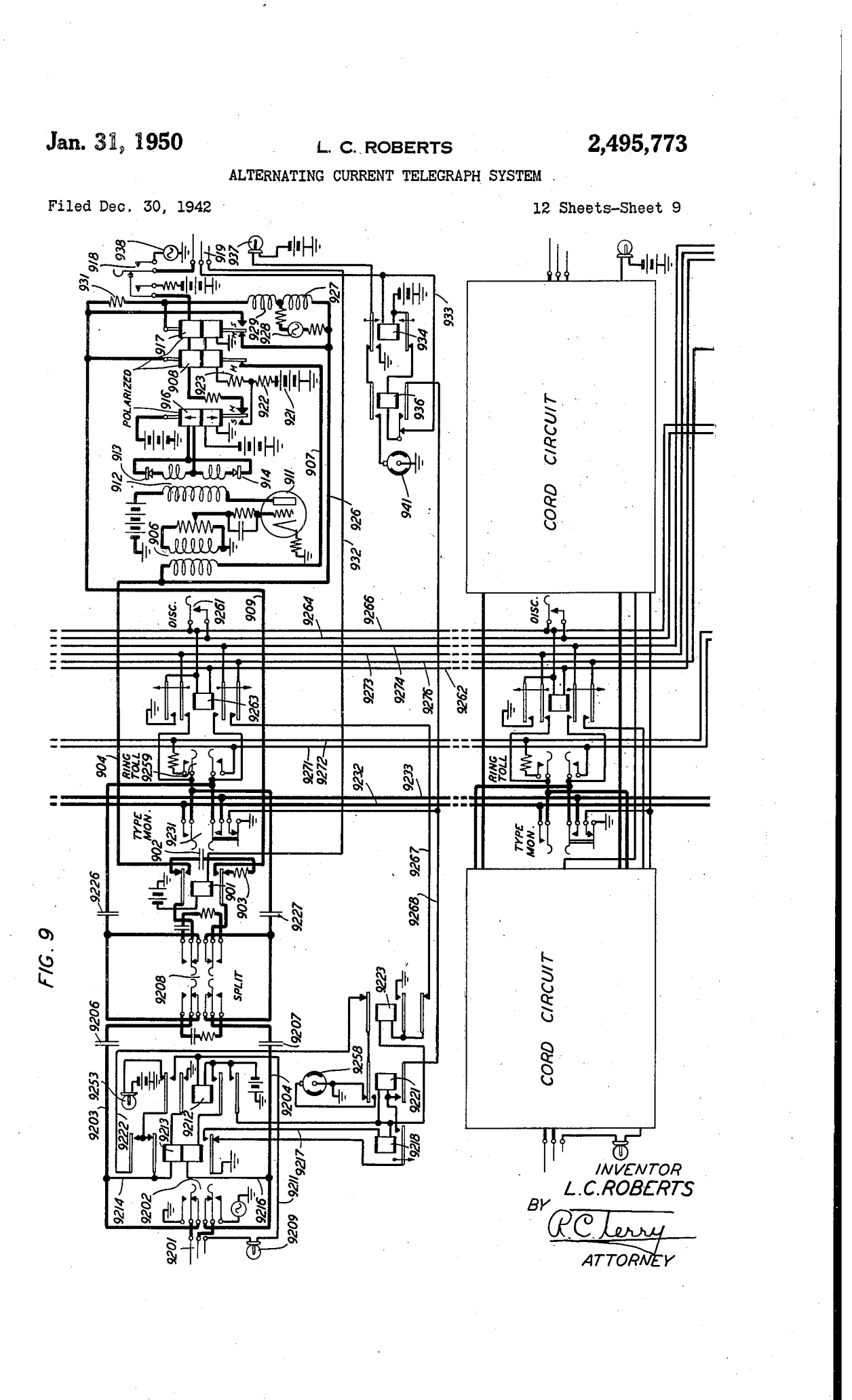

Fig. 9 is a diagrammatic view showing cord circuits for establishing connections to the line termination circuits of toll subscribers, one of the cord circuits being shown in full schematic form and another being shown in symbolic form;

Fig. 10 is a diagrammatic view showing the line termination circuit for a toll subscriber station equipped to accommodate direct current signals;

Fig. 11 is a diagrammatic view showing a toll subscriber's station circuit;

Figs. 12 to 16 are diagrammatic views showing how the figures hereinbefore identified may be combined to show several systems through which subscribers' stations may be interconnected for communication, and as such systems involve duplication of apparatus at opposite ends thereof and in certain instances at intermediate points, some of the representations of the figures have been shown in dotted outline to indicate that if duplicate drawings had been provided in sufficient number to enable any one of the systems to be laid out in its entirety, those figures indicated in dotted outline would be in reverse or mirror image form in order to bear proper relationship to the figures preceding them;

More specifically, Fig. 12 represents a system for interconnecting two local subscribers served by a single central office station and both equipped for the transmission and reception of alternating current signals;

Fig. 13 represents a system for interconnecting two subscribers served by individual central office stations, connection being established over intertoll trunk circuits and all signal transmission being upon an alternating current basis;

Fig. 14 represents a system for interconnecting two subscribers served by separate central office stations, the central office stations being connected over a long toll line adapted to transmit direct current signals, so that signal conversion between alternating and direct current occurs in both central office stations;

Fig. 15 represents a system for interconnecting two subscribers' stations, the geographical separation between which is so great that the two central offices which directly serve the subscribers' stations become interconnected over intertoll trunks through an intermediate central office station where a regenerative repeater is connected between the intertoll trunks. The signal transmission is on an alternating current basis throughout the system; and Fig. 16 represents a system for interconnecting two subscribers served by one central office station, one of the stations being a local subscriber equipped to transmit and receive alternating current signals and the other subscriber being a toll subscriber equipped to transmit and receive direct current signals so that a signal conversion takes place in the central office station.

*Local subscriber's station and line circuit*

Figure 1:
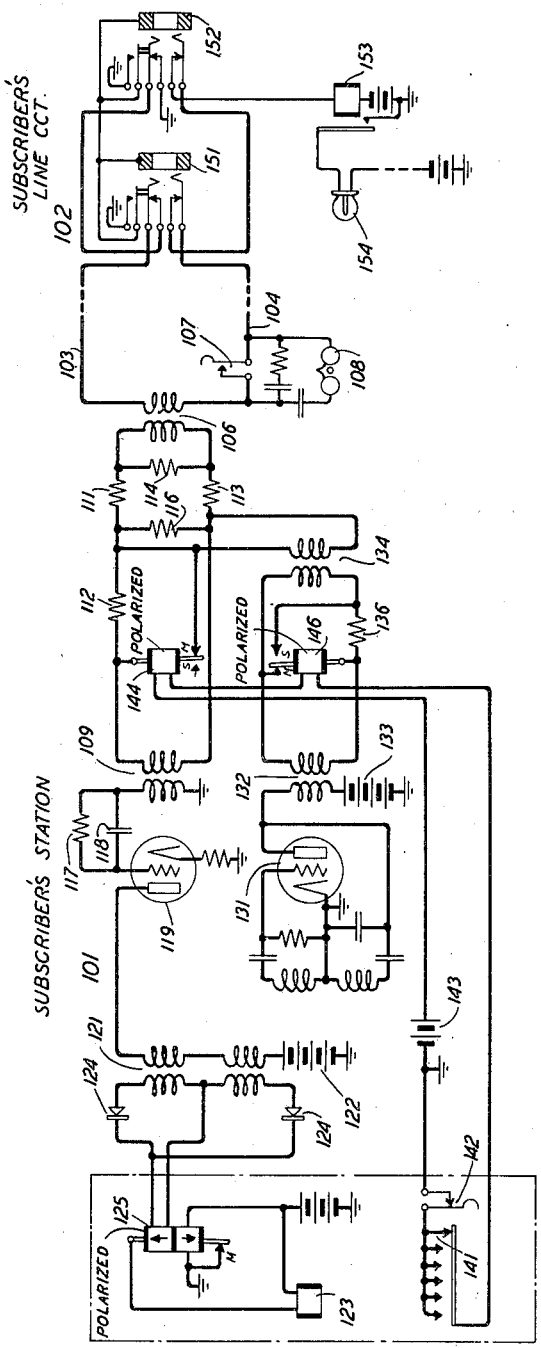
Fig. 1 is a diagrammatic view showing subscribers' stations equipped to transmit and receive alternating current signals, and their line termination circuits at a central office station, one of the subscribers' stations and associated line termination circuit being shown in full schematic form and the other being shown symbolically.
Figure 1A:
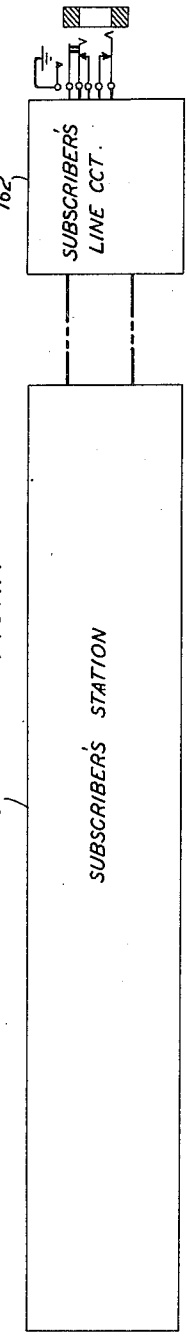
Fig. 1A is a view in block diagram form representing a subscriber's station and subscriber's line circuit which may be identical with the station and line circuit shown in Fig. 1.

The system represented by Fig. 12 will be first described and, accordingly, reference is had to Fig. 1 in which a local subscriber's station circuit 101 is connected to subscriber's line circuit 102 by line conductors 103 and 104. The subscriber's line circuit 102 is individual to the subscriber's station 101 and is located at the central office station.

The line conductors 103 and 104 terminate at the station 101 in a loop which includes one winding of a transformer 106 and a key 107 which when closed short-circuits a ringer circuit 108 and conditions the line circuit for signal transmission between the subscriber's station and the central office station, and when opened, adds the ringer 108 to the loop circuit in series with the right-hand winding of transformer 106. The left-hand winding of transformer 106 is connected to the right-hand winding of a transformer 109 through resistors 111 and 112 on one side and through resistor 113 on the other side. A resistor 114 is connected in shunt with the left-hand winding of transformer 106 at the right-hand end of resistors 111 and 113 and a resistor 116 is connected in shunt with resistor 114 at the left-hand end of resistors 111 and 113.

The left-hand winding of transformer 109 has one terminal connected to ground and the other terminal connected through high resistance grid leak 117 shunted by condenser 118 to the grid of an electron discharge tube 119, the cathode of which is connected through a biasing resistor to ground. Tube 119 serves as an amplifier of trains of alternating current which represent code impulses of permutation code signals, and the anode of tube 119 is connected through the primary winding of transformer 121 to anode battery 122. The secondary of transformer 121 is center tapped and both halves of the winding are connected in parallel with one winding of a biased polar relay 125, the lower or biasing winding of which moves the armature to the marking contact when no current flows in the upper winding which, when energized, overcomes the biasing winding and moves the armature to spacing. In the marking condition the relay 125 completes the circuit of the selector magnet 123 of a printing telegraph receiving recorder which may be of the type shown in Patent 1,904,164, granted April 18, 1933, to S. Morton et al. The disclosure of the Morton patent is incorporated herein by reference as part of the present specification, and it is to be understood that the selector magnet 123 symbolizes a receiving printing telegraph recorder. Rectifiers 124 are so associated with the two halves of the secondary winding of transformer 121 that current through the upper winding of relay 125 will always be in the same direction whether current in the anode circuit of tube 119 is rising or falling.

Subscriber's station 101 is provided with a generator of alternating current in the form of an electron tube oscillator 131. The anode circuit of oscillator 131 includes the primary winding of a transformer 132 through which anode current flows from anode battery 133. The secondary winding of transformer 132 is connected to the primary winding of a transformer 134 through a resistor 136 on one side and directly on the other side and the secondary of transformer 134 is connected in parallel with resistor 116 and thus in parallel with the lefthand winding of transformer 106 and with the primary of transformer 109. Oscillator 131 generates oscillatory signaling current which is transferred through transformer 132, transformer 134 and transformer 106 into line conductors 103 and 104 for transmission to the central office station and also through transformer 109, amplifier tube 119, transformer 121 and rectifiers 124 to selector magnet 123 for the production of a home record corresponding to signals generated at the subscriber's station 101. The selector magnet 123 is responsive either to rectified signals transferred through transformer 106 from line conductors 103 and 104 or to rectified signals transferred through transformer 134 from oscillator 131.

Transmitting contacts 141 which may be controlled by a keyboard mechanism as shown in the Morton et al patent are contained in a normally closed circuit which includes break key 142, battery 143, winding of relay 144, and winding of relay 146. When break key 142 is closed and one of the transmitting contacts 141 is closed, which is the marking condition, relays 144 and 146 are energized to hold their armatures on the marking contacts. When relay 144 is energized, it short-circuits the resistor 112 through its armature and marking contact and when the relay is deenergized, it opens the short-circuit across resistor 112 and completes no circuit on its spacing contact. When the relay 146 is energized, it short-circuits the secondary winding of transformer 132 through its armature and marking contact and when relay 146 is deenergized, it short-circuits the resistor 136 through its armature and spacing contact. Relays 144 and 146 preferably are biased polar relays whereby the armatures move to the spacing position when break key 142 or all of the transmitting contacts 141 are open and when break key 142 and any of the transmitting contacts are closed, the spacing bias is overcome and the armatures move to the marking contacts.

Since the output of oscillator 131 is short-circuited through the armature and marking contact of relay 146 when transmitting contacts 141 are in the rest or idle condition, which is a marking condition, it will be apparent that no oscillatory current is being supplied through transformers 134 and 109 to the amplifier 119, so that the marking condition is represented by withholding or absence of oscillatory current from the input circuit of amplifier 119. When the circuit of relay 146 is interrupted at break contact 142 or transmitting contacts 141, the armature of relay 146 leaves the marking contact, thus removing the short-circuit across the secondary of transformer 133, and goes to its spacing contact, thus short-circuiting resistor 136, so that alternating current at full amplitude is applied to the primary winding of transformer 134, and corresponding current is induced in the secondary winding of that transformer. In the transit interval of relay 146, spacing current flows at less than full amplitude because resistor 136 has not yet been short-circuited. This arrangement for keying the oscillator is different from another keying circuit which will be described later, in that the spacing oscillatory current begins to flow in the primary winding of transformer 134, although at less than full amplitude, the instant that the armature of keying relay 146 leaves its marking contact, whereas in the arrangement to be described later, the spacing oscillatory current is not applied to the output circuit or to the receiving amplifier circuit until after the keying relay reaches its spacing contact. The latter arrangement may introduce bias in the signal due to the travel time of the keying relay, whereas in the keying arrangement shown in Fig. 1 such bias is avoided.

The purpose of relay 144 is to compensate for signal level differences between locally generated and received signals. It will be apparent that received signals will be of lesser amplitude than locally generated signals due to the attenuation of received signals during transmission. It will also be apparent that the receiving amplifier circuit must be sensitive to received signals. Signals generated at the station shown in Fig. 1 must be of sufficient amplitude to operate the receiving amplifier at the central office station or at a remote station and since such signals are also applied to the receiving amplifier locally for home record purposes, their amplitude may be such as to overload the amplifier. The signal level compensation is achieved by short-circuiting the resistor 112 when relay 144 is in the marking condition, which is the condition in which it should be when the subscriber's station is receiving signals, it being remembered that the local oscillator is applying no tone to the receiving amplifier circuit or to the line circuit, so that spacing trains of oscillator current will be applied to the primary of transformer 109 as received over the line conductors without attenuation by resistor 112. However, when the station shown in Fig. 1 is transmitting, each time relay 146 operates to spacing, to transmit a spacing train of oscillatory current, relay 144 will move to spacing and will open the short-circuit across resistor 112, thus providing for reduction in the amplitude of the oscillatory current applied to the primary of transformer 109.

The grid resistance-condenser combination associated with the receiving amplifier is for the purpose of rendering the amplifier unresponsive to echo current. The outgoing signals, although impressed on the amplifier through resistor 112, are strong enough to cause the grid to become positive and, therefore, charge the condenser. Until the condenser becomes discharged, the amplifier tube 119, which is of the variable mu type, is less sensitive to incoming signals, and thus will not respond to echo currents.

At the central office station the line conductors 103 and 104 terminate in subscriber's line circuit 102 which comprises answering and calling jacks and call indicators. Specifically, line conductor 103 terminates at the tip spring of calling jack 151 and conductor 104 terminates at the ring spring of this jack. The break contacts which are normally engaged by the tip and ring contact springs of calling jack 151 when the jack is idle are connected to the tip and ring contact springs of answering jack 152. Each of the jacks 151 and 152 has a grounded make contact through which ground will be connected to the sleeve of the jack when a plug is inserted into the jack and the sleeves are connected together so that both will be grounded upon the insertion of the plug into either of the jacks. It will be understood that multiple answering and calling jacks may be provided if desired so that more than one operator may have access to the subscriber's line circuit and that the sleeves of all of the jacks will be grounded upon the insertion of a plug into any one of them.

The break contact which is normally engaged by the tip spring of the answering jack 152 is connected to ground and the break contact which is normally engaged by the ring spring of jack 152 is connected through the winding of line lamp relay 153 to grounded battery. The front contact of relay 153 is connected to ground and the armature is connected through line lamp 154 to grounded battery.

When the subscriber's station shown in Fig. 1 is in the idle condition, key 107 which is a call, recall and disconnect key, is open and ringer 108 is connected in the line loop. Due to the presence of condensers in the ringer circuit, direct current will not flow and relay 153 will be deenergized. When it is desired to set up a call from the subscriber's station shown in Fig. 1, key 107 is closed. This completes a circuit from ground through the break contact and tip contact spring of jack 152, break contact and tip contact spring of jack 151, line conductor 103, right-hand winding of transformer 106, closed key 107, line conductor 104, ring contact spring and break contact of jack 151, ring contact spring and break contact of jack 152 and winding of relay 153 to grounded battery. Relay 153 will be energized over this circuit and will attract its armature to complete the circuit for lamp 154 which will be lighted to indicate to an operator at the central office station that a call is awaiting on answering jack 152.

*Central office cord circuit, operator's set and supervisory apparatus*

Figure 3:
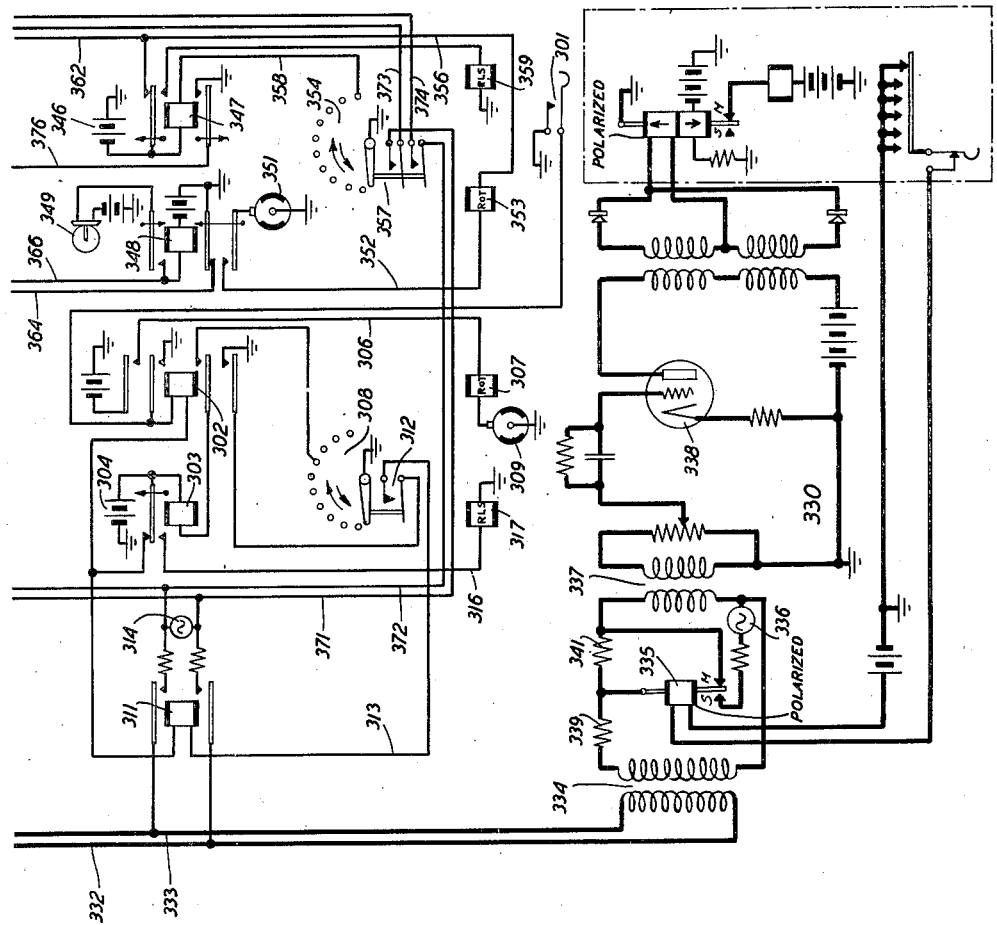
Fig. 3 is a diagrammatic view showing an operator's set and associated supervisory apparatus.

The operator's cord circuit and associated apparatus is shown in Figs. 2 and 3. At the left of Fig. 2 is an answering plug 201 which the operator inserts into jack 152. By this operation the circuit of line lamp relay 153 is interrupted at both break contacts of jack 152 and the subscriber's loop circuit is extended over the tip and ring of plug 201 through the swinger springs and break contacts of subscriber ringing key 202 and through conductors 203 and 204, condensers 206 and 207 to the swinger springs of the left-handed side of splitting key 208.

As a further result of the insertion of plug 201 into jack 152, ground is connected to the sleeve of the jack through the auxiliary make contact of jack 152 and through the sleeve of plug 201, lamp 209, conductor 211 and winding of relay 212 to grounded battery. Over this circuit lamp 209 is lighted and relay 212 becomes energized. At the innermost upper armature and front contact of relay 212, ground is connected through the upper winding of a relay 213, conductor 214, upper break contact and upper swinger spring of subscriber's ringing key 202, through the tip circuit of plug 201 and jack 152, subscriber's loop which is closed at key 107, ring circuit of jack 152 and plug 201, lower swinger spring and break contact of key 202, conductor 216 lower winding of relay 213 and innermost lower armature and front contact of relay 212 to grounded battery. Upon the energization of relay 213 a circuit is completed from ground through its lower armature and front contact, conductor 217, winding of relay 218, conductor 219 and outer lower armature and front contact of relay 212 to grounded battery. Relay 218 which has a slow-release characteristic becomes energized and at its armature and front contact prepares an energizing circuit for a relay 221, which at this time is open at the back contact and lower armature of relay 213 since relay 218 has just become energized through the lower armature and front contact of relay 213. At the outer upper armature of relay 212, a substitute energizing circuit for the relay is completed from grounded battery through the relay winding, front contact and outer upper armature, front contact and outer upper armature of relay 213, conductor 222, back contact and upper armature of a relay 223 and upper armature and back contact of relay 221 to ground, this path being in short-circulating relation to lamp 209 so that the lamp is extinguished.

The left-hand half of the cord circuit shown in Fig. 2 is now fully prepared to supervise action taken by the subscriber at the station shown in Fig. 1, and the operator at the central office station can now communicate with the subscriber for the purpose of determining the identity of the station called. For this purpose the break contacts engaging the upper and lower swinger springs of both halves of splitting key 208 to which the subscriber's loop has been extended are connected through conductors 228 and 229 and through condensers 226 and 227 to the swinger springs of an operator's set connecting key 231, the make contacts of which are connected through conductors 232 and 233, 332 and 333 to the left-hand winding of a transformer 334. The right-hand winding of transformer 334 is connected to an operator's set 330 which may be identical with the subscriber's station apparatus shown in Fig. 1 with the exception of the omission of a call key and ringer apparatus, but which has been shown in Fig. 3 as being provided with a different type of keying apparatus, to which reference has been made previously. Since the receiving portion of the operator's set is like that shown in Fig. 1 it will not be described in detail.

As to the transmitting apparatus, the circuit of the transmitting contacts and break key includes the winding of a single relay 335 which is preferably a biased polar relay operable to move the armature to the spacing contact when the circuit of the operating winding is open but holding its armature on the marking contact when the circuit of the operating winding is closed.

The source of alternating signaling current 336, which has been indicated conventionally for the sake of simplicity but which may be an electron tube oscillator as in the showing in Fig. 1, has one terminal connected to one side of the right-hand winding of transformer 334 and the other terminal connected to the spacing contact of keying relay 335. The side of the right-hand winding of transformer 334 to which alternating current source 336 is connected is also connected to one terminal of the primary winding of a transformer 337, the secondary of which serves as the input for the amplifier tube 338. The armature of relay 335 is connected through resistor 339 to the upper terminal of the right-hand winding of transformer 334 and through resistor 341 to the upper terminal of the primary winding of transformer 337. The marking contact of relay 335 is connected to the right-hand end of resistor 341. When relay 335 is in the marking condition, the source of alternating signaling current 336 is disconnected from transformers 334 and 337 so that no oscillatory current is being supplied to those transformers, which is the marking condition, as hereinbefore set forth. Also the armature and marking contact of relay 335 short-circuits resistor 341 which it is desired to interpose ahead of the amplifier circuit only in the case of strong locally generated signals. When the armature of relay 335 moves to the spacing contact, the source of alternating current 336 is connected across the right-hand winding of transformer 334 and across the primary winding of transformer 337 for the transmission of alternating current signals over conductors 332 and 333 and for the local recording of signals corresponding thereto. In this case the resistor 341 is included between the source of alternating current signals and the amplifier tube 338 for reducing the amplitude of those signals. It is to be noted that following the opening of the break key or of the transmitting contacts of the operator's set, the initiation of the spacing signal is delayed by the transit time of the armature of relay 335 until the armature reaches the spacing contact, which may subject the signals to a bias. If it is found that such bias is present, the type of keying circuit shown in Fig. 1 may be employed in the operator's set.

The operator connects the transmitting and receiving set 330 over conductors 332, 333, 232 and 233 to the conductors 228 and 229 by moving the swinger springs of key 231 into engagement with their make contacts. The operator may then manipulate the keyboard transmitter of set 330 to inquire of the subscriber as to the identity of the station with which a connection is desired. Assuming that connection is desired to another local subscriber such as the subscriber's station 161 in Fig. 1, identical with station 101 having subscriber's line circuit 162 identical with the subscriber's line circuit 102, or such as a subscriber's station indicated in the dotted outline of Fig. 1 at the right-hand side of Fig. 13, such connection may be completed directly through the right-hand portion of the cord circuit shown in Fig. 2. This portion of the cord circuit is identical with the left-hand portion previously described, having subscriber ringing key 242 corresponding to key 202, relay 243 corresponding to relay 212, relay 244 corresponding to relay 213, relay 246 corresponding to relay 218, relay 247 corresponding to relay 221, relay 248 corresponding to relay 223 and lamp 249 corresponding to lamp 209.

The operator tests the called subscriber's line for a busy condition by touching the tip of plug 241 to the sleeve of the calling jack of the called subscriber's line circuit. If the called subscriber's line is busy, there will be a ground connection on the sleeve of the jack due to the fact that a plug is already inserted in some other jack associated in multiple with the subscriber's line circuit, and the ground connection will be extended over the tip of plug 241, tip swinger spring and break contact of key 242, conductor 251, inner upper armature and back contact of relay 244, outer upper armature and back contact of relay 243, conductor 252 and busy lamp 253 to grounded battery. It is to be noted that busy lamp 253 also serves the left-hand half of the cord circuit by being also connected to the back contact associated with the outer upper armature of relay 212. If lamp 253 does not light, this indicates that the called subscriber's line is not busy and accordingly plug 241 is inserted into the called subscriber's calling jack.

The operation of the springs of the called subscriber's calling jack places a ground on the sleeve of plug 241 which causes lamp 249 to be lighted and relay 243 to be operated. Relay 243 seeks to complete the energizing circuit for relay 244, but as in the case of relay 213, the circuit of relay 244 can be completed only through the loop circuit at the subscriber's station which, in the case of a called subscriber, will be open to direct current at the subscriber's call key. Since relay 244 will not be energized at this time, the substitute energizing circuit for relay 243 from ground on the back contact of the upper armature of relay 247 will be interrupted at the outer upper armature of relay 244 so that relay 243 will be energized only through lamp 249 and the lamp will remain lighted.

The operator rings the called subscriber by operating ringing key 242 to connect ground to the tip of plug 241 and source 254 of alternating current, usually having a frequency of the order of 20 cycles per second for ringing current, to the ring of plug 241. The ringing current will operate the ringer at the called subscriber's station which is included in the subscriber's loop because the call key is open. Presumably, the operator will not ring continuously but only intermittently, restoring key 242 to normal condition after each ringing interval, awaiting evidence that the called subscriber answers. The call is answered by closure of subscriber's call key which short-circuits the ringer and completes through the loop the energizing circuit for the relay 244. The relay 244 upon being operated, energizes relay 246 which prepares the energizing circuit for relay 247, completes the substitute energizing circuit for the relay 243 in short-circuiting relation to the lamp 249 which becomes extinguished, and is an indication to the operator that the called subscriber has answered.

The called subscriber having answered, the operator may then transmit signals from the transmitter of the operator's set to instruct the calling subscriber to proceed with message transmission. This may be accomplished without transmission of the instructions to the called subscriber by operating the right-hand half of the splitting key 208, the effect of which is to disconnect the tip and ring conductors of the right-hand portion of the cord circuit from the conductors 228 and 229 and also from the tip and ring conductors of the left-hand portion of the cord circuit and to interconnect the tip and ring conductors of the right-hand portion of the cord circuit through condenser 256 and resistor 257 in series. Having instructed the calling subscriber to proceed, the operator restores the right-hand half of the splitting key to normal condition to reconnect the right-hand portion of the cord circuit to the left-hand portion and also restores the key 231 to normal condition to disassociate the operator's set from the cord circuit through which the calling and called subscriber's are interconnected, thus freeing the operator's set for answering another call.

Subscriber break signals

Either subscriber may send a break signal merely by opening his break key such as the key 142 in Fig. 1. This will cause a continuous spacing signal to be transmitted during the interval that the break key is held open, and the break mechanism with which the receiving printers at the interconnected stations may be provided as disclosed in the Morton et al patent, will respond to the break signal. No supervisory operation occurs in the cord circuit as a result of subscriber break signals.

Subscriber recall signals

Either subscriber may recall the operator at the central office station by momentarily opening and then reclosing his call key. Assuming that the subscriber at the station shown in Fig. 1 momentarily opens the call key 107 to recall the operator, the circuit through the upper and lower windings of relay 213 will be interrupted and this relay will release its armatures. The ground connection on the lower armature of relay 213 will be transferred from the winding of relay 218 to its armature. Relay 218 has a slow-release characteristic and will not release if the relay 213 remains released only momentarily. Accordingly, relay 221 will become energized from ground on the lower armature of relay 213 through the back contact, armature and front contact of relay 218, winding of relay 221, conductor 219, inner lower armature and front contact of relay 212 to grounded battery. Although the ground connection for relay 212 in short-circuiting relation to lamp 209 is interrupted when the outer upper armature of relay 213 is released, relay 212 remains energized from ground on the sleeve of jack 152 through lamp 209, so that the lamp becomes lighted. At its lower armature and front contact, relay 221 establishes its own holding circuit to ground through the auxiliary break contacts of key 231 to ground. At the upper armature of relay 221, direct ground connection on the back contact is replaced by a ground connection supplied through an interrupter device 258 which supplies ground connection intermittently at a suitable rate, such as one impulse per second. The intermittent ground connection thus provided, short-circuits lamp 209 and causes the lamp to flash, which is an indication to the operator to cut in on the cord circuit by operating key 231 to the off-normal condition. When key 231 is operated to enable the operator to check by telegraphic communication as to the reason for the recall, the auxiliary break contacts of key 231 are opened thus interrupting the holding circuit for relay 221 which becomes deenergized, restoring steady ground for holding relay 212 in short-circuiting relation to lamp 209 so that the lamp is extinguished.

Subscriber disconnect signals

A subscriber disconnects at the end of message transmission by opening his call key. Assuming that the key 107 in Fig. 1 is opened and remains open, the operation in the cord circuit will be the same as that involved in the recall signal, namely, the energization of relay 221 and establishment of its locking circuit and substitution of intermittent ground connection for steady ground connection to the inner upper armature of relay 213. However, since the key 107 is not reclosed, relay 213 remains deenergized and relay 218 releases, which has no effect on the relay 221 since its locking circuit has already been established. However, the intermittent ground connection is not extended to the winding of relay 212 in short-circuiting relation to the circuit of lamp 209 because the outer upper armature of relay 213 remains out of engagement with its front contact since relay 213 is released. Accordingly, the interrupter 261 will have no effect on lamp 209 and it will burn steadily in the holding circuit of relay 212. The operator interprets the steadily illuminated lamp 209 as a disconnect signal and withdraws plug 201 from jack 152. The operator also withdraws plug 241 from the calling jack of the other local subscriber if lamp 249 has become illuminated steadily to indicate that that subscriber has opened his call key. The withdrawal of the plugs 201 and 241 from the jacks which they had been engaging interrupts the circuit of lamps 209 and 249 and of relays 212 and 243 in series therewith respectively. Relays 212 and 243 disconnect battery from relays 221 and 247 respectively, thus releasing those relays and the cord circuit is restored to normal condition.

*Intertoll trunk and relay circuit*

The next system to be described is that delineated in Fig. 13 involving interconnection of a local subscriber of one central office station with a local subscriber of another central office station over an intertoll trunk circuit extending between the two central office stations. Each of the two subscribers' stations to be interconnected may be of the type shown in Fig. 1 and the apparatus at each central office station including the cord circuit operator's set and associated apparatus may be of the type shown in Figs. 2 and 3. The intertoll trunk and relay circuit is shown in Figs. 4 and 5. The trunk circuit termination is shown in detail for one end of the trunk circuit, such apparatus being located at one of the central office stations and the duplication of this apparatus at the remote central office station is indicated diagrammatically by the rectangles, jack and lamps at the right of Fig. 5.

Assume that the operator has answered a call from the subscriber's station shown in Fig. 1 by the insertion of plug 201 into jack 152, has ascertained the identity of the called subscriber, and inserts plug 241 into jack 401 of the intertoll trunk circuit. The tip contact spring of jack 401 is connected to conductor 402 which extends to the upper terminal of inductance 403 and to the left-hand terminal of condenser 404. The ring contact spring of jack 401 is connected to conductor 406 which extends through the armature and back contact of slow-release relay 407 to the lower terminal of inductance 403 and to the left-hand terminal of condenser 408. With the insertion of the plug into jack 401, auxiliary make contacts of the jack are closed whereby a circuit is completed from grounded battery 409 through the closed make contacts, conductor 411 and winding of relay 412 to ground. Relay 412 becomes energized and through its left-hand armature and front contact extends a ground connection over conductor 410 to the sleeve of jack 401, from which the connection is extended through the sleeve of plug 241, lamp 249, and winding of relay 243 to grounded battery. Relay 243 causes the upper and lower windings of relay 244 to become energized, the circuit being extended through the tip and ring contact springs of jack 401 and over conductors 402 and 406 bridged by inductance winding 403 to form a closed direct current loop. Lamp 249, which became operated in series with the winding of relay 243 becomes extinguished due to the establishment of a short-circuiting ground connection from the upper back contact of relay 247 through the upper armature and back contact of relay 248, the outer upper armature and front contact of relay 244 and the outer upper armature and front contact of relay 243 over which circuit the relay 243 is held energized. Relay 244 also causes relay 246 to become energized, thus preparing an energizing circuit for relay 247. These operations are identical with those which occurred when the operator answered a call from the subscriber's station shown in Fig. 1 by means of plug 201.

Besides establishing a circuit for operating relay 243 in the right-hand portion of the cord circuit shown in Fig. 2, the relay 412 establishes a circuit from battery on its right-hand armature through the front contact and through the right-hand winding of relay 413. Relay 413 becomes energized and through its armature and front contact connects power to busy lamp 414 which lights. All jacks which are connected in multiple with jack 401 have busy lamps associated therewith and such lamps are connected in multiple with lamp 414 so that the busy condition is indicated at all multiple jack terminations of the left-hand end of the trunk circuit shown in Figs. 4 and 5. Thus it is not necessary for an operator to test for a busy condition of the intertoll trunk since a busy condition of a trunk is positively indicated by lighted lamps at all appearances of its jack terminals.

Having thus conditioned the near end of the intertoll trunk circuit for operation, the operator rings the distant end of the intertoll trunk by opening the left-hand side of splitting key 208 to keep the ringing signal out of the local subscriber's side of the cord circuit and by closing the toll ringing key 259 for an interval of approximately two to five seconds. The ring toll key connects a source of alternating current 314 at the frequency employed for telegraphic communication in the system shown, through conductors 371 and 372, conductors 271 and 272, closed contacts of ring toll key 259, condensers 226 and 227 and the closed contacts of the right-hand portion of the splitting key and through the tip and ring of plug 241 and tip and ring contacts of jack 401 to conductors 402 and 406. Thus a spacing signal having a duration of two to five seconds is transmitted into the intertoll trunk circuit.

The right-hand terminal of each of the condensers 404 and 408 is connected through conductors 405 and 415 to a hybrid coil 516 and the spacing impulse trains of alternating current flow through the condensers 404 and 408 to this coil. The condensers 404 and 408 block off from the hybrid coil direct current which flows in conductors 402 and 406 for energizing the relay 244, and the inductance 403 provides a direct current path for this current in addition to serving as a filter in combination with the condensers 404 and 408. For reasons which will be described hereinafter, it is desirable that in the trunk circuit, marking signals shall be represented by a flow of alternating current and spacing signals shall be represented by a no current condition. Since this is the opposite of the condition in the local subscriber's line and in the cord circuit, it is necessary to provide a signal transposing circuit associated with the intertoll trunk circuit. This transposing circuit will now be described.

The spacing signals comprising trains of alternating current induce alternating currents at the same frequencies in windings 517 and 518 of the hybrid coil. These coils are in series, and a condenser 519 shunted by a resistor 521 has one terminal connected to the point of interconnection of the two windings 517 and 518. The other ends of the windings 517 and 518 are connected through half-wave rectifiers 522 and 523 to the other terminal of condenser 519. This circuit serves as a full-wave rectifier for rectifying the spacing trains of alternating current received over conductors 402 and 406 and for charging condenser 519 with such rectified current. There is also connected across condenser 519 and resistance 521 a circuit comprising a source of alternating current 526, which generates current at the signaling frequency, condenser 527, resistor 528, primary winding of transformer 529 and rectifier 531. When the full-wave rectifier circuit, including rectifiers 522 and 523, is charging condenser 519, the condenser blocks the flow of current from alternating current source 526 through the primary of transformer 529 so that no current flows in that winding of the transformer. When current ceases in conductors 402 and 406 which is the marking condition, condenser 519 discharges and permits current to flow through the primary winding of transformer 529 and rectifier 531 so that a marking signal of alternating current flow is induced in the secondary of transformer 529. Thus as a result of the toll ringing spacing signal lasting from two to five seconds, no current is generated in the secondary winding of transformer 529. This winding of the transformer is connected through band-pass filter 532 to toll line conductors 533 and 534 which extend to the remote central office station where they enter the receiving circuit of an intertoll trunk and relay circuit identical with that shown in Figs. 4 and 5. In the signal transposing circuit, a battery 536 has one terminal connected through resistor 537, primary winding of transformer 529 to one terminal of rectifier 531 and the other terminal of the battery is connected through resistor 521 to the other terminal of rectifier 531. This battery normally biases the rectifier 531 so that it operates on the linear portion of its characteristic.

Since only one end of the intertoll trunk circuit has been shown in detail, namely, in Figs. 4 and 5, it is necessary to consider the effect of received call and other signals as if received from the remote station shown at the right of Fig. 5. In considering the receipt of the toll ringing signal in particular, it will be necessary to consider the relays 412 and 413, heretofore described as having been energized due to the insertion of plug 241 into jack 401, as being released. Signals are received over a separate pair of receiving conductors designated by the reference numerals 541 and 542 and signals received over these conductors are impressed upon a band-pass filter 543, the output of which is connected to the primary winding of transformer 544. The reason for providing band-pass filters 532 and 543 is that the conductors 533 and 534 may carry a plurality of outgoing messages simultaneously, the different messages being characterized by different frequencies of signaling current and the conductors 541 and 542 may carry a plurality of incoming messages similarly differentiated. The band-pass filter 532 suppresses frequencies other than those intended to be transmitted from the oscillatory current source 526 and the filter 543 suppresses from the primary winding of transformer 544 all but one message frequency or band of frequencies.

The secondary winding of transformer 544 is connected to the grid circuit of an amplifier tube 546, the anode circuit of which is coupled through a resistance capacity coupling to a second stage amplifying tube 547. The anode circuit of tube 547 includes the primary winding of an output transformer 548, the secondary winding of which is center tapped and is connected in a full-wave rectifier circuit 550 similar to that previously described comprising the hybrid coil windings 517 and 518, the rectifiers 522 and 523 and condenser 519 shunted by resistor 521. The rectifier circuit 550 controls the flow of current from a source of oscillatory current 549 through the primary winding of a transformer 551 having a half-wave rectifier 552 in the same relation to source of oscillatory current 549, the rectifier circuit 550 and the primary winding of transformer 551 that rectifier 531 has to source of oscillatory current 546, the full-wave rectifier circuit which includes condenser 519 and the primary winding of transformer 529. Thus marking intervals of oscillatory current received over the line conductors 541 and 542 are amplified in the two stage amplifier and are transposed into marking signals of no current condition in the secondary of transformer 551. The secondary of transformer 551 is connected to the input of a band-pass filter 553, the output of which is connected into the hybrid coil 516 whereby the transposed signals are impressed on conductors 402 and 406 by which they are conducted to the cord circuit shown in Fig. 2.

Transformer 548 has a tertiary winding which is connected across the input terminals of a full wave bridge rectifier circuit 554, the output circuit of which includes resistor 556, condenser 557 shunted across resistor 556, and a series of two condensers 558 and 559 shunted across condenser 557, the condenser 559 having a resistor 561 in shunt therewith. From the point of interconnection of condensers 558 and 559, conductor 562 is connected back to the grid circuit of amplifier tube 546. The rectifier circuit 554 and associated apparatus serves as an automatic gain control system rectifying a portion of the output of the second stage amplifier tube 547 and applying back to the grid circuit, over conductor 562, a biasing voltage which supplements the normal biasing voltage provided by the cathode resistor of tube 546 and which varies inversely as the signal level. When a weak signal is impressed upon the grid of tube 546, the voltage impressed across rectifier circuit 554 is less than when a strong signal is received and accordingly tube 546 is biased less negatively as a result of reception of a weak signal than of a strong signal. Thus a substantially constant level of signal impressed on the secondary of transformer 548 can be maintained.

The automatic gain control feature having been described, the reason for the transposition of signals so that the trunk circuits shall carry oscillatory current for the marking condition and no current for the spacing condition may be explained. The idle condition of conductors 533 and 534 will be the marking condition with oscillatory current flowing since, with no current flowing in conductors 402 and 406, whether because of the fact that no plug is inserted into jack 401 or because of an idle interval or lull in communication between two stations connected over the trunk circuit, the signal rectifier in the transposition circuit will be receiving no signal and accordingly oscillatory current from oscillator 426 will be flowing in the primary winding of transformer 429. The same condition will be true with respect to line conductors 541 and 542 so that during the idle time the amplifier comprising tubes 546 and 547 will be amplifying the received marking signal and the gain of the amplifier will be held down by the rectified portion of the signal in the automatic gain control apparatus. When spacing intervals of no current are received over conductors 541 and 542, the gain of the amplifier will tend to rise but the condensers in the output of the rectifier circuit 554 will delay such rise. If no signal transposition had been provided in the trunk circuit, there would be no current during the idle or marking condition and the biasing voltage supplied by the automatic gain control circuit would substantially or completely disapper thus greatly increasing the sensitivity of the amplifier so that extraneous disturbances received over the conductors 541 and 542 might disturb supervisory apparatus which is under the control of signals, as will presently be described, and abnormal amplification of the first train of oscillatory current received upon the initiation of transmission might result.

There is connected across the resistor and condenser in the rectifier circuit 550, the winding of a slow-release relay 566. When marking current is being rectified by rectifier circuit 550, the potential difference across the condenser in the rectifier circuit causes relay 566 to remain energized. However, when a spacing signal of no current is received for an interval longer than that normally encountered in permutation code signal combinations, of which the toll ringing signal of spacing nature lasting from two to five seconds is an example, relay 566 will release. The front contact with which the grounded left-hand armature of relay 566 cooperates is connected through conductors 567 and 467 to one terminal of the winding of a relay 416, the other terminal of which is connected to grounded battery so that relay 416 is normally energized. Upon the release of relay 566, the energizing circuit of relay 416 is interrupted and as the relay 416 has a slow-release characteristic, it releases after a short interval. The armature of relay permits a make-before-break contact which is connected to battery to engage a contact which is connected to conductor 468 which extends through the left-hand winding of relay 413 to ground. Thus the energizing circuit for the left-hand winding of relay 413 is completed under the control of the toll ringing signal and completes the circuit of the busy lamp at the called central office station.

The battery connection on conductor 468 is extended through conductor 417, stepping magnet 418 of a stepping switch having contact banks 419 and 421, conductor 422, left-hand armature and back contact of a relay 423 to ground supplied through an interrupter 424 which supplies sixty ground connection impulses per minute. Stepping magnet 48 is thus energized and released at this rate to advance the brushes associated with contact banks 419 and 422 one step for each energization and release of magnet 418, the brushes being held as they are advanced by a check pawl which is under the control of a release magnet 426. At the first step of the brushes no circuit is established in either of the contact banks. At the second step a circuit is completed from ground on the brush associated with contact bank 421 through the winding of a relay 427 to battery on conductor 468 supplied through the contacts of relay 416 in the released condition, which now exists since relay 566 is released, so that the relay 427 becomes energized and its armature disengages its movable front contact from a fixed back contact in make-before-break manner. The brush associated with contact bank 419, engaging the second contact, establishes a conductive path from grounded battery on the right-hand armature of relay 412 through the back contact, winding of relay 428, conductor 429, second contact and brush of stepping switch contact bank 419, conductor 431, armature and front contact of relay 427, conductor 432, off-normal contacts 433, the upper pair of which closes when the brushes of the stepping switch move out of the normal position, conductors 469 and 569 to the right-hand front contact of relay 566. Since the relay 566 is at this time released due to reception of the toll ringing signal of spacing nature, this conductive path is not at this time completed to ground on the right-hand armature of relay 566, and relay 428 does not become energized at this time.

Contacts 2, 3, 4 and 5 of contact bank 419 are connected together. Contacts 2 to 8 inclusive, of contact bank 421 are connected together, so that relay 427 remains energized as the stepping switch brushes advance step by step and the energizing circuit for relay 428 remains prepared. Since the toll ringing signal should not exceed five seconds duration, the reception of such signal should terminate before the brushes associated with contact banks 419 and 421 leave the fifth contact. The termination of the toll ringing signal will result in the reenergization of relay 566, thus completing at the right-hand armature and front contact the energizing circuit of relay 428 and at the left-hand armature the circuit of relay 416.

With relay 428 energized, a night alarm circuit is operated from ground through the front contact and outer right-hand armature of the relay. A holding circuit for relay 428 is completed from ground through the front contact and inner right-hand armature of the relay. The circuit of the right-hand winding of relay 413 is completed from grounded battery through the inner left-hand armature and front contact of relay 428 and a line lamp is operated from the same grounded battery through the outer left-hand armature and front contact of relay 428 over conductor 436.

As a result of the reenergization of relay 566, relay 416 becomes reoperated as previously stated, from ground on the left-hand armature of relay 566, and disconnects battery from conductor 468, connecting the battery in make-before-break manner through its armature and through the winding of release magnet 426 to the fixed contact of relay 427. The battery connection thus extended to release magnet 426 is disconnected from conductor 468 and thus from the left-hand winding of relay 413, which remains energized by current through its right-hand winding, and is also disconnected from relay 427, which releases its armature, thereby opening the energizing circuit for relay 428, which is now held by its locking circuit, and completing the energizing circuit for release magnet 426 from the fixed contact of relay 427 through the movable front contact, conductor 432, upper pair of contacts of the off-normal contacts 433, now closed, conductors 469 and 569 and left-hand armature and front contact of relay 566 to ground. The release magnet 426 retracts the holding pawl for the stepping switch brushes and the brushes are returned to normal by a spring. As the brushes return to normal, they operate the off-normal contacts 433 to the condition shown in Fig. 4 thereby interrupting the energizing circuit for the release magnet 426.

The lighting of the line lamp 434 at the called central office station is an indication to an operator thereat to answer the call on the trunk. This is done by inserting the plug at one end of a cord circuit similar to that shown in Fig. 2 into the trunk circuit termination jack exemplified by the jack 401 in Fig. 4. The insertion of a plug into the jack at the called central office station has the same effect as that resulting from insertion of a cord circuit plug into the trunk circuit jack at the calling central office station, namely, energization of the relay 412 from the auxiliary make contacts of the jack which grounds the sleeve of the pack for controlling the cord circuit supervisory lamp and which completes the energizing circuit for the right-hand winding of relay 413. In completing the circuit for the right-hand winding of relay 413, the relay 412 interrupts the holding circuit for the relay 428 which releases, thus extinguishing the line lamp 434, removing the previously applied battery connection for energizing the right-hand winding of relay 413 and interrupting the night alarm circuit. Thus both ends of the trunk are placed in identical condition, namely, with relays 412, 413, 416 and 566 energized and all other relays released. The busy lamp 414 is lighted at both ends of the trunk.

The calling operator thereupon transmits to the called central office station telegraph signals identifying the called subscriber's station. The operator at the called central office station completes a connection to the called subscriber's line circuit through the other end of the cord circuit and rings the called subscriber. The operators may then disassociate their operators' sets from the communication channel thus set up by restoring the keys 331 to normal and the splitting keys 208 must be placed in the condition shown in Fig. 2 in order for signals to be transmitted back and forth between the two subscribers.

*Intertoll recall*

Referring now to Fig. 3, apparatus is shown by means of which an operator at one terminal of a trunk circuit may recall the operator at the other terminal of the trunk circuit. Recall key 301 of which there is one for each operator's set is normally open and has one contact connected to ground and the other connected through the winding of relay 302, back contact and armature of relay 303 to grounded battery 304. Upon the momentary closure of key 301, relay 302 becomes energized. At its outer upper armature and front contact, grounded battery is connected over conductor 306 and through the winding of stepping magnet 307 of a stepping switch, which has a single bank of contacts 308, to ground through an interrupter 309 which supplies connection to stepping magnet 307 at the rate of sixty impulses per minute. At the inner upper armature and front contact of relay 302, a holding circuit for the relay is established. At the inner lower armature and front contact of relay 302, an energizing circuit for relay 303 is prepared extending from grounded battery 304 through the winding of relay 303, inner lower armature and front contact of relay 302 to the seventh contact of contact bank 308. At the outer lower armature of relay 302 a circuit is prepared for the energization of relay 311 from ground on the front contact through the outer lower armature of relay 302 to normally open off-normal contacts 312 of stepping switch 399, which are so controlled by the brush of the stepping switch that the contacts close when the brush steps out of the normal position, conductor 313, winding of relay 311, back contact and armature of relay 303 to grounded battery 304.

Prior to the operation of recall key 301, the key 331 which associates the operator's set with the particular cord circuit into which the recall signal is to be transmitted should have been closed and the splitting key 208 on the side toward the local subscriber should have been operated to keep the recall signal from being transmitted to the local subscriber. The two armatures of relay 311 are connected to the make contacts of key 231 over conductors 332, 232, 333 and 233, and the front contacts of the relay are connected to the terminals of a source of oscillatory current 313, which generates alternating current at the signal transmission frequency. Thus a spacing signal will be transmitted through the right-hand portion of the cord circuit in Fig. 2 and into the trunk circuit where it will be transposed from a spacing signal represented by alternating current to a spacing signal of no current which will be transmitted to the central office station at the remote end of the trunk.

The brush of the stepping switch, which is connected to ground, advances at the rate of one step per second and therefore reaches the seventh contact in seven seconds, at which time it completes the energizing circuit for relay 303. The armature of relay 303 interrupts the holding circuit for relay 302, which releases, and also interrupts the energizing circuit for relay 311 thus terminating the transmission of the seven second spacing signal representing a recall, and relay 303 completes a circuit over conductor 316 for release magnet 317 of the stepping switch. Release magnet 317 releases the stepping switch brush which returns to normal and opens the off-normal contacts 312. Relay 303 has a slow-release characteristic to afford the brush of the stepping switch time in which to return to the normal position, since the energizing circuit for relay 303 is interrupted as soon as relay 302 releases its armature.

The seven second recall signal has no effect on the trunk circuit supervisory relay system in the central office station in which the signal is generated. For the purpose of describing the effect of the transmission of the seven second recall signal upon the trunk circuit supervisory relay system at the distant central office station, reference will be had to Figs. 4 and 5 as if such signal had been received from the central office station at the right-hand side of Fig. 5. Since the recall signal has the same characteristic as the toll ringing signal but is longer, relay 566 will release its armatures, thus interrupting the energizing circuit for relay 416 which again sets the stepping switch in operation. At the second step of the stepping switch brushes, relay 427 is energized from the contact bank 421 but relay 428 does not become energized through the armature of relay 427 and through contacts 2 to 5, inclusive, of contact bank 419 because battery is disconnected from the circuit of relay 428 at the right-hand back contact and armature of relay 412. When the brush associated with contact bank 419 reaches the sixth contact, to which contacts 7 and 8 are also connected, a conductive path is extended from the right-hand front contact of relay 566 over conductors 569 and 469, upper contacts of off-normal contacts 433, now closed, conductor 432, movable front contact and armature of relay 427, conductor 431, stepping switch brush and contact bank 419, specifically the sixth, seventh and eighth contacts thereof, conductor 441, outermost right-hand armature and back contact of relay 423 and winding of relay 407 to grounded battery. This circuit does not receive ground connection at the right-hand armature of relay 566 until the termination of the recall signal and restoration of the signaling circuit to marking condition which occurs upon the release of the recall signal relay, such as the relay 311 in Fig. 3.

Upon the restoration of the trunk circuit to marking condition, relay 566 becomes reenergized, completing the energizing circuits of the relays 407 and 416. Relay 407 opens the path for direct current through conductors 402 and 406 and inductance 403, thereby releasing the cord circuit supervisory relay exemplified by the relay 244. Relay 416 opens the energizing circuit for relay 427 and prepares the energizing circuit for release magnet 426 which circuit is completed through the fixed contact and movable front contact of relay 427, the upper closed pair of off-normal contacts 433 to ground on the right-hand armature of the energized relay 566. As the brush associated with contact banks 419 leaves the sixth contact in returning to normal, it interrupts the energizing circuit for relay 407 which has a slow-release characteristic. The circuit for relay 244 is thus opened only momentarily, which corresponds to the previously described momentary opening of call key 107 in Fig. 1, and which has the same effect, namely, the energization of relay 247 to cause lamp 249 to flash to indicate the recall signal.

The operator at the recalled central office station responds to the recall signal by closing the key corresponding to key 231, which will connect the operator's set to the particular cord circuit, one of the effects of which is to release the lamp flashing control relay 247, and by transmitting signals acknowledging the recall, whereupon the operator awaits reception of information or instructions from the operator at the recalling central office station. The operator at the recalled station may prevent the signals interchanged between the two central office stations from reaching the recalled station's local subscriber by opening the splitting key in the portion of the cord circuit that is connected to the local subscriber's line circuit.

Intertoll disconnect

When a subscriber whose station circuit has been extended over an intertoll trunk circuit disconnects at the conclusion of message transmission in the manner heretofore described, the operator at the station which serves such local subscriber momentarily closes a disconnect key 261 (Fig. 2) individual to the cord circuit. This closes a circuit from grounded battery 346 through the upper armature and back contact of a relay 347, conductors 362 and 262, winding of relay 263 individual to the cord circuit, closed disconnect contacts 261 conductors 264 and 364, and back contact and inner lower armature of a slow-operating relay 348 to ground. At its outer upper armature and front contact relay 263 connects ground to the winding of the relay for holding the relay energized independently of the ground at the inner lower armature of relay 348. The ground connection for holding relay 263 energized is also extended over conductors 266 and 366 and through the winding of relay 348 to ground. It will be noted that while the disconnect contacts 261 are closed, the relay 348 tends to be energized from the ground on its inner lower armature through conductors 364 and 264, the closed contacts 261, conductors 266 and 366, winding of relay 348 to grounded battery. Since the relay 348 upon being energized interrupts the ground connection at its lower inner armature this might tend to cause relay 348 to vibrate if it had a fast-operating characteristic. However, by making relay 348 slow-operating, relay 263 becomes operated first and provides ground connection at its outer upper armature and front contact so that relay 348 does not tend to release due to interruption of the ground contact at its inner lower armature and back contact nor due to the opening of contacts 261 after their momentary closure.

The upper armature of relay 348 is connected through lamp 345 to grounded battery so that upon the energization of relay 348, lamp 349 operates from the ground connection at the outer upper front contact and armature of relay 263 through which the energizing circuit of relay 348 was completed. The outer lower armature of relay 348 receives ground connection through an interrupter 351 which operates to supply ground connection at the rate of 60 impulses per minute. The front contact with which the outer lower armature of relay 348 cooperates, is connected by conductor 352 to one terminal of the stepping magnet 353 of a single contact bank stepping switch 354, the contact arm of which is connected to ground. The other terminal of stepping magnet 353 is connected through conductor 356 and the back contact and upper armature of relay 347 to grounded battery 346. Each time interrupter device 351 connects ground to conductor 352, stepping magnet 353 is operated to advance the brush of stepping switch 354 one step. Upon movement of the brush of stepping switch 354 out of the normal position, two pairs of normally open off-normal contacts 357 are permitted to close. These contacts extend connections from the source 314 of oscillatory current at the signaling frequency over conductors 371 and 372, the now closed off-normal contacts 357, conductors 373 and 374, conductors 273 and 274, the inner upper and lower armatures and front contacts of relay 263 to condensers 226 and 227 and through the condensers and conductors 228 and 229 to both halves of the cord circuit shown in Fig. 2. It will be recognized that this is a spacing signal and since the right-hand portion of the cord circuit is connected by plug 241 to the intertoll trunk circuit, the spacing signal is transmitted into the intertoll trunk circuit where it is transposed to a spacing signal represented by no current condition which is transmitted to the remote central office station.

The contact brush of stepping switch 354 advances one step per second due to the frequency of the interrupter device 351 and it is not until the brush reaches the tenth contact representing ten second transmission of the spacing signal that it encounters a conductive path. At the tenth contact the energizing circuit of relay 347 is completed from the grounded brush of the stepping switch 354, through conductor 358 and the winding of relay 347 to grounded battery 346. At the upper armature of relay 347, the circuit of stepping magnet 353 is interrupted and the circuit of release magnet 359 is completed from battery 346 through the winding of the release magnet to direct ground. Release magnet 359 retracts the check pawl for the brush arm of stepping switch 354 thus permitting the brush to be returned to normal position by its return spring and upon the return of the brush to normal, the off-normal contacts 357 are opened, thus disconnecting the source of oscillatory spacing current 314 from the cord circuit.

The lower armature of relay 347 completes a circuit from the grounded front contact through conductors 376 and 276, outer lower armature and front contact of relay 263, conductor 267 to conductors 268 and 269. Over conductor 268 the circuit is extended through the outer lower armature and back contact of relay 223, winding of that relay, and conductor 225 to the inner lower armature of relay 212 and through its front contact to grounded battery. Over conductor 269, the circuit is extended through the outer lower armature and back contact of relay 248, winding of that relay, conductor 245 and inner lower armature and front contact of relay 243 to grounded battery. The relays 223 and 248 establish holding circuits for themselves at their inner lower armatures and grounded front contacts. They also interrupt the circuits over which ground was supplied for energizing them at their outer lower armatures and back contacts. At their upper armatures and back contacts they interrupt the holding circuits for the relays 212 and 243 in short-circuiting relation to the lamps 209 and 249, thus causing the lamps to be lighted which is an indication that the transmission of the ten-second disconnect signal of spacing nature has been completed.

It may be that the operator will have removed plug 201 from the local subscriber's line circuit jack when lamp 209 came on in response to the local subscriber's disconnect signal. In that event relay 212 will have been released due to withdrawal of plug 201 from the local subscriber's line circuit jack, thus removing the battery connection for relay 223 so that the relay would not become energized from the ground supplied through the lower armature and front contact of relay 347. Even if the operator had not withdrawn plug 201 from the subscriber's line circuit jack, lamp 209 would already have been lighted due to the release of relay 213 in response to the subscriber's disconnect signal so that the operation of relay 223 will have no effect upon lamp 209 if the subscriber had already disconnected. Upon the lighting of lamp 249 the operator removes plug 241 from the intertoll trunk circuit jack and plug 201 from the local subscriber's line circuit jack if this had not been done previously and relays 212, 213, 243, 244, 223, 248, 246, and 218 and 221, if operated, are released. When relay 347 interrupted the circuit of stepping magnet 353, it also interrupted the holding circuit for relay 263. This relay has a slow-release characteristic in order to afford time for the operation and locking of relays 223 and 248 and the relay 263, in releasing opens the circuit of relay 348 which releases. The relay 348 upon releasing extinguishes lamp 349 so that the extinguishment of this lamp as well as the lighting of lamp 249 indicates completion of transmission of the disconnect signal.

The effect of the reception of the disconnect signal at the remote central office station will now be considered using Figs. 4 and 5 for such consideration as if the disconnect signal had been received from the remote central office station shown at the right of Fig. 5. In response to the received spacing signal of no-current condition, relay 566 releases and the same set of operations occurs that took place in response to the toll ringing and recall signals, namely, the release of relay 416 and the operation of stepping magnet 418 for the stepping switch. Since the disconnect signal is of ten seconds duration, the brushes of the stepping switch will be advanced to the tenth contact. Throughout the traversal of contacts 2 to 8, inclusive of contact bank 421 by its brush, relay 427 is energized, thus extending a conductive path from the right-hand front contact of relay 566 over conductors 569 and 469, upper pair of off-normal contacts 433, now closed, conductor 432, movable front contact and armature of relay 427, conductor 431, to the brush associated with stepping switch bank 419. As this brush traverses contacts 2 to 5, inclusive, the path is extended to relay 428 but no circuit is completed because relay 566 is released and relay 412 is energized. As the brush traverses contacts 6 to 8, inclusive, the path is transferred to relay 407 which does not become energized because relay 566 is released. The ninth and tenth contacts of contact bank 419 have no external connection so that no circuit is established by the brush of contact bank 419 throughout its ten steps. When the brush associated with bank 421 moves from the eighth to the ninth contact, it releases relay 427 and completes the energizing circuit for relay 423. The ninth and tenth contacts of contact bank 421 are connected together so that the energizing circuit for relay 423 is also maintained in the last position of the stepping switch brushes. At its left-hand armature and back contact, relay 423 interrupts the energizing circuit for stepping magnet 418 and prevents further advancement of the stepping switch brushes. It may be that the brushes will not reach the tenth contact depending upon the speed of operation of relay 423 in relation to the operation of interrupter 424, but it is not essential that the brushes reach the tenth contact since there is no difference in the circuit established between the ninth and the tenth contacts.

The disconnect signal terminates within one second after the stepping switch brushes reach the ninth contact and upon such termination relay 566 becomes reenergized. Under this circumstance, a holding circuit for relay 423 is established from the grounded left-hand armature and front contact of relay 566 over conductors 567 and 467, inner right-hand armature and front contact and right-hand winding of relay 423 to battery through the right-hand armature and front contact of relay 412 which is energized while a cord circuit plug remains in jack 401. Ground supplied over conductor 467 is also extended through the middle right-hand armature and front contact of relay 423 to relay 407 which becomes energized and opens the loop formed by conductors 402 and 406 and the inductance 403. The ground connection on conductor 467 also effects the reenergization of relay 416 which completes a circuit from grounded battery through its movable front contact and armature, winding of release magnet 426, fixed contact and movable front contact of relay 427, which is now released, conductor 432, upper pair of off-normal contacts 433 now closed and conductors 469 and 569 to the right-hand front contact of relay 566 which is engaged by its grounded armature. The release magnet 426 becomes energized over this circuit and retracts the holding pawl for the brushes of the stepping switch which return to normal under the influence of their restoring springs.

When the brushes of the stepping switch return to normal position, they return the off-normal contacts 43 to the condition shown in Fig. 4, opening the circuit of release magnet 426 at the upper pair of contacts, and at the lower pair of contacts connecting ground over conductor 471, the make contact controlled by the inner right-hand armature of relay 423 and permitted to close by that armature when the relay is energized, through the winding of relay 407 to grounded battery, thus supplementing the ground connection supplied over conductors 567 and 467 and through the middle right-hand armature and front contact of relay 423 to the winding of relay 407. The supplemental ground connection also extends to the front contact of the middle right-hand armature of relay 423 which is connected to the swinger of the make contact controlled by the inner right-hand armature and through the middle right-hand armature, the inner right-hand armature and front contact and the right-hand winding of relay 423 and front contact and right-hand armature of relay 412 to grounded battery. Thus the supplemental ground connection holds relay 423 energized and relay 407 energized even though relay 566 may subsequently be released in response to a spacing signal, whether intentional or fortuitous. The holding of relay 423 through the supplemental ground connection prevents repetitious operation of the stepping switch even though relay 566 should be released for a period sufficient to initiate operation of the stepping switch, because relay 423 has opened the circuit to the source of intermittent ground connection for the stepping magnet 418 at the left-hand armature and front contact of the relay.

The effect of the operation of relay 407 to open the loop in the trunk circuit and into the cord circuit connected to the trunk circuit through jack 401 is the same as that occurring when a local subscriber connected to a cord circuit opens his call key, namely, the release of the cord circuit supervisory relay such as the relay 244 which causes lamp 249 to be illuminated steadily, since although relay 247 becomes operated, the relay 244 remains released and interrupts the circuit from the source of intermittent ground connection. The lighting of lamp 249 steadily informs the operator at the remote central office station of reception of the disconnect signal whereupon the operator removes the cord circuit plug from jack 401. Upon the removal of the plug from jack 401, the circuit of relay 412 is released and this relay at its left-hand armature removes ground connection from the sleeve of jack 401 and at its right-hand armature opens the energizing circuit for the right-hand winding of relay 413 and the right-hand winding of relay 423. Relay 413 upon releasing opens the circuit of busy lamp 414 which becomes extinguished and relay 423 interrupts the energizing circuit for relay 407 which releases to restore the trunk circuit loop to closed condition. Thus the trunk circuit is restored to the normal idle condition.

Upon removal of the cord circuit plug from jack 401, the operator would presumably also remove a plug at the opposite end of the cord circuit from the local subscriber's line circuit jack unless that subscriber had recalled or otherwise indicated that further telegraphic service was desired.

*Intertoll operation over a direct current toll line*

The next system which will be described is that exemplified in Fig. 14 in which two central office stations serving subscribers whose stations are operable on alternating current signals are to be interconnected through a toll line which is equipped to transmit direct current signals only and wherein a conversion from alternating current to direct current signals and conversely occurs in the intertoll trunk circuit at both central office stations. The system differs from that shown in Fig. 13 only in the substitution of Fig. 6 for Fig. 5.

Referring now to Figs. 4 and 6, it will be noted that the conductor 405 which extends from the right-hand side of condenser 404 is connected to conductor 605 which extends to the armature of a relay 601. Conductor 415 which extends from the right-hand side of condenser 408 connects with conductor 615 which extends through the primary winding of a transformer 602 to the marking contact of relay 601. A source of alternating current 603 which generates oscillatory current at the signaling frequency is connected between conductor 615 and the spacing contact of relay 601.

Relay 601 is a polarized relay responsive only to signals received from the remote central office station, and has three windings. The upper winding is the biasing winding and seeks to move the armature to the spacing contact but is able to do so only when current is not flowing in either of the other two windings. The middle winding is a locking or reflection estoppel winding and has one end connected to ground and the other end connected to the spacing contact of a sending relay 604. The lower winding is the operating winding and has one end connected to loop conductor 606 and the other end connected to the marking contact of relay 604. The effect of current in either the middle or the lower winding is the same, namely, to oppose and overcome the effect of the biasing winding of relay 601 to cause relay 601 to assume or remain in the marking condition.

The armature of sending relay 604 is connected to the positive terminal of signaling battery 607. When the sending relay 604 is on the marking contact, it supplies energizing current for the operating winding of relay 601 to drive the armature of that relay to the marking position. When sending relay 604 is in the spacing condition, it opens the energizing circuit for the operating winding of relay 601 but supplies energizing current to the middle or locking winding to hold the armature of relay 601 on the marking contact to prevent relay 601 from connecting source of alternating current 603 across conductors 605 and 615, which would represent the transmission of a spacing signal toward the trunk circuit jack 401.

The secondary winding of transformer 602 is connected to the grid circuit of amplifier tube 608, the anode circuit of which includes the primary winding of output transformer 609. The secondary winding of transformer 609 is center tapped and has the tap connected to one terminal of the operating winding of sending relay 604, the other terminal of which is connected to the ends of the secondary winding through individual half-wave rectifiers 611 and 612 connected to form a full-wave rectifier for supplying direct current to the lower or operating winding of the sending relay 604. The biasing winding of relay 604 operates the armature into engagement with the marking contact when no current is flowing in the operating winding and when current is flowing in the operating winding, resulting from the rectification of alternating current received over conductors 605 and 615 and amplified by tube 608, the effect of the biasing winding is overcome and the armature of relay 604 is moved to the spacing contact. It will be apparent that this represents a transposition of signals comparable with that heretofore described in Fig. 5 since with no oscillatory current applied to conductors 605 and 615 from conductors 402 and 406, there will be no current in the operating winding of relay 604 and the relay will be in the marking condition, whereas when oscillatory current is being received from conductors 402 and 406, and is being amplified and rectified, relay 604 will be driven to the spacing condition.

Conductor 606 is connected to one terminal of a slow-release relay 616 which corresponds in function and operation to the relay 566 in Fig. 5. The other terminal of relay 616 is connected through conductor 617 to one terminal of the operating winding of the break relay 618 from the other terminal of which a path extends through the operating winding of sending repeater relay 619 to the armature of receiving repeater relay 621. The biasing windings of relays 618 and 619 are also connected in series and to the armature of relay 621. The marking contact of receiving repeater relay 621 is connected to negative battery which is in series aiding relation to battery 607 when relays 621 and 604 are in marking condition so that current flows through the operating winding of relay 601 to hold it in marking condition and also flows through relay 616 to hold that relay energized. The spacing contact of relay 621 is connected to the armature of break relay 618 which receives positive battery when relay 618 is in the marking condition, so that when relay 621 goes to spacing positive battery 623 is connected in series opposition to battery 607 and no current flows in the operating winding of relay 601, in relay 616 or in the operating windings of relays 618 and 619. When relay 621 reverses the polarity of battery applied through its armature to the operating windings of relays 618 and 619, it also reverses the flow of current through the biasing windings of those relays so that they are prevented from following signals generated by relay 621.

Receiving relay 621 has one terminal of its operating winding connected to the outgoing line 624 and the other terminal of that winding connected to the armature of sending repeater relay 619, the marking and spacing contacts of which are connected to negative and positive batteries 626 and 627, respectively. The biasing winding of relay 621 has one terminal connected to the armature of relay 619 and the other terminal connected through balancing network 628 to ground. When relay 619 responds to signals generated by sending relay 604 and reverses the polarity of battery connected to the operating winding of relay 621, it also reverses the direction of current through the biasing winding of that relay so that relay 621 does not follow the signal responsive operation of relay 619.

The function of break relay 618 is disclosed in Patent 1,634,299, granted July 5, 1927, to R. D. Parker and the disclosure of this patent is incorporated herein by reference as part of the present specification. Briefly it may be stated that the purpose is to enable a station which is receiving over a line to break in on the line or interrupt the distant sending station in order to obtain control of the circuit. This is accomplished by providing that the break relay, operating in series with the sending repeater relay, when in the spacing condition, connects the same polarity of battery to the spacing contact of the receiving repeater relay that the marking contact of that relay carries, so that the receiving repeater relay cannot reverse the polarity of current through the biasing winding of the sending relay from that polarity which exists when the receiving relay is on the marking contact. Were it not for the provision of the break relay to prevent the reversal of the bias on the sending relay under the circumstance that repeater sending relay 619 is controlled by relay 604 to attempt to send a spacing signal against telegraph signals being received over line 624 by the receiving repeater relay 621, the sending repeater relay 619 might respond to reversals of polarity of biasing current under the control of signals received by relay 621 so as to retransmit signals over conductor 624 instead of transmitting the spacing signal generated at the sending relay 604. With break relay 618 present to prevent the reversal of polarity on the biasing winding of repeater sending relay 619, the relay 619 can go to spacing condition under the control of relay 604 and irrespective of the condition of relay 621, and can transmit a steady spacing signal over conductor 624 as long as the spacing signal is generated by relay 604, thereby interrupting transmission from the remote central office station or from a subscriber served by the remote central office station to the receiving repeater relay 621 over line conductor 624.

The diagrammatic representation of apparatus at the right-hand end of line conductor 624 represents apparatus duplicating that shown in Figs. 4 and 6 in inverse or mirror image relation. As exemplified by Fig. 14, a circuit through to a subscriber would include central office apparatus in accordance with Figs. 2 and 3 and finally a subscriber's line circuit and station in accordance with Fig. 1. The duplication of repeater apparatus corresponding to the relays 618, 619 and 621 at the remote end of line conductor 624 may involve minor differences such as the reversal of polarities applied to the marking and spacing contacts of the repeater sending relay corresponding to relay 619, in order to provide for current flow over line conductor 624 for the marking condition and no current for the spacing condition.

The conversion of alternating current to direct current signals for transmission over the direct current toll line 624 and reconversion of the direct current signals to alternating current signals at the remote central office station does not alter in any way the manner of setting up calls nor the supervision of such calls involving toll ringing, recall and disconnect signals. Relay 616, being included in the direct current portion of the transmission system, is held energized in response to marking signals and is released in response to spacing signals, which is the same as the mode of operation of relay 566 contemplated in Fig. 5. The relay 616 sets the stepping switch in Fig. 4 in operation and depending on the interval during which relay 616 is released, namely, two to five seconds, seven seconds or ten seconds, the stepping switch brings up the toll ringing signal, the recall signal or the disconnect signal. Such signals are brought up at both ends of the intertoll trunk circuit in response to their initiation at either end since the relay 616 responds to signals generated by sending relay 604 or received by repeater repeating relay 621 and permits the stepping switch in Fig. 4 to be actuated in accordance with the duration of a prolonged spacing signal, and a relay corresponding to the relay 616 at the remote central office station responds to signals in either direction and causes to be brought in the corresponding supervisory signals at the remote central office station, from which it is apparent that the operation of relay 616 is in all respects comparable with the operation of relay 566.

*Alternating current tandem system with regenerative repeater*

The next system to be described is that exemplified by the arrangement of figures indicated in Fig. 15. This arrangement of the figures of the drawings represents a system for interconnecting two subscribers' stations which are at such distance from each other that the central office stations which serve them cannot be directly interconnected over a single intertoll trunk but must be connected over a minimum of two intertoll trunks in tandem through an intermediate central office station. Because of the fact that signals transmitted over long distances, although repeated and amplified in the intertoll trunk circuits, may deteriorate due to distortion, which distortion is amplified as part of the signal by amplifiers such as the one shown in Fig. 5, it may be necessary to restore the signals to their original condition by means of a regenerative repeater which may be located at one or more intermediate central office stations through which the intertoll trunks are interconnected. Accordingly, the system shown in Fig. 15 represents, reading from left to right, a subscriber's station and line circuit equipped to transmit alternating current signals (Fig. 1), a central office station cord circuit, operator's set and supervisory apparatus (Figs. 2 and 3), an intertoll trunk circuit equipped to transmit alternating current signals (Figs. 4 and 5), a cord circuit, operator's set and supervisory apparatus at the intermediate central office station (Figs. 2 and 3), a regenerative repeater and connector circuit therefor (Figs. 8 and 7, respectively), a second cord circuit (Fig. 2) which may be served by the same operator's set and supervisory apparatus as that shown at the left of Figs. 7 and 8, a second intertoll trunk circuit (Figs. 5 and 4), a central office station cord circuit, operator's set and supervisory apparatus (Figs. 2 and 3) and finally a subscriber's line circuit and station (Fig. 1).

Referring to Fig. 7, the connector circuit for the regenerative repeater has a plurality of jacks, of which jacks 701, 702 and 703 are representative, which serve the dual purpose of seizing the connector circuit and establishing connections thereto from an intertoll trunk circuit through a cord circuit, and a plurality of other jacks of which the jacks 706, 707 and 708 are representative, which serve the single purpose of establishing connections from the connector circuit to another intertoll trunk circuit through another cord circuit. Jacks 701, 702, and 703 therefore represent the front end of the connector circuit and the circuit is always seized by the insertion of a cord circuit plug into one of these jacks. Each of the front end jacks appears at a different operator's position, since when any one of the jacks is seized, the connector circuit associated therewith is seized and only one connection may be routed through a connector circuit at any one time. Accordingly, there is no occasion for multiple appearances of the jacks of one connector circuit at any one operator's position.

The sleeves of all the jacks of the connector circuit are grounded for establishing an operating circuit for the cord circuit supervisory lamp through the sleeve of a cord circuit plug inserted into any one of the jacks. Each connector circuit comprising multiple appearances of pairs of connector jacks, the jacks 702 and 707, for example, representing a pair, has associated therewith one regenerative repeater and the connector circuit has associated therewith a stepping switch comprising five banks of contacts for associating the regenerative repeater with a particular front end jack and its companion jack that have been seized by an operator. Thus each operator does not have exclusive access to one connector circuit and regenerative repeater and there may be a smaller number of connector circuits and regenerative repeaters than the number of operators' positions, the number required being dependent upon traffic load conditions. It will be understood that each operator may have access to a plurality of connector circuits.

The tip and ring contact springs of jacks 701, 702 and 703 are connected to corresponding contacts in the second and third contact banks of stepping switch 709. The companion jacks 706, 707 and 708 have their tip and ring contact springs connected to corresponding contacts in the fourth and fifth banks of contacts of stepping switch 709. Thus if jack 701 is considered as the first appearance of the connector circuit, its tip and ring contact springs are connected to the No. 1 contacts of the second and third contact banks and accordingly, the tip and ring contact springs of jack 706 are connected to the No. 1 contacts of the fourth and fifth contact banks. Similarly the tip and ring contact springs of jack 702 are connected to the No. 7 contacts of the second and third contact banks and the tip and ring contact springs of jack 707 are connected to the No. 7 contacts of the fourth and fifth contact banks. Each of the jacks 701, 702 and 703 has an auxiliary pair of normally open contacts which close when a cord plug is inserted into the jack. One of the auxiliary contacts of each of the jacks 701, 702 and 703 is connected to one terminal of an individual relay 711, 712 and 713, the other terminals of which are connected to grounded battery. The other auxiliary contact of each jack is connected to a movable front contact normally engaging a fixed contact, and disengageable therefrom by the lower armature of an individual one of relays 751, 752 and 753. The fixed contacts which the movable front contacts engage are connected by conductor 756 to the back contact of a relay 754, the armature of which is connected to ground, as are the lower armatures of relays 751, 752 and 753. The relay 754 has one terminal connected to grounded battery and the other terminal connected by conductor 757 to the upper armature of each of the normally deenergized relays 751, 752 and 753. With relay 754 deenergized, which is its idle condition, ground on its back contact is extended in parallel through contacts of the relays 751, 752 and 753 to one of the auxiliary contacts of each of the jacks 701, 702 and 703. The energizing circuits of the relays 751, 752 and 753 and the function of those relays and of relay 754 will be set forth later.

Assuming that a cord circuit plug is inserted in jack 702, a signaling path from the tip and ring of the cord plug is extended through the tip and ring contact springs of jack 702 and through conductors 714 and 716 to the No. 7 contacts of the third and second contact banks, respectively, of stepping switch 709. At the auxiliary contacts of jack 702, the ground available at one of them is extended through the other to relay 712 which becomes energized. The outer lower armature of relay 712, and also of relay 711 and relay 713, is connected to ground and the inner lower armature is connected through a busy lamp individual to each of the jacks to grounded battery. The busy lamps for jacks 701, 702 and 703 are designated 717, 718 and 719, respectively. The outer lower armature of each of the relays 711, 712 and 713 cooperates only with a front contact and the inner lower armature of each relay cooperates only with a back contact and these contacts are all connected to a conductor 721. Thus when any one of the relays is energized, in the present example, relay 712, ground is extended over conductor 721, to the contacts associated with the lower armatures of all of the relays. Since the inner lower armature of relay 712 is out of engagement with its back contact, the circuit of busy lamp 718 is not completed but the circuits of all other busy lamps of the connector circuit are completed through the back contacts and inner lower armatures of the other relays, represented by relays 711 and 713, which are deenergized, so that lamps 717 and 719 illustrated in Fig. 7 become illuminated to indicate at all multiple appearances of the front end jacks of the connector circuit that the circuit is busy. The outer upper armature of relay 711 is connected to grounded battery and its back contact is connected by conductor 722 to the No. 1 contact of the first contact bank of stepping switch 709. One terminal of relay 751 is also connected to conductor 722 and the other terminal is connected to grounded battery poled the same as the battery on the outer upper armature of relay 711, so that these batteries are in opposition and relay 751 is unoperated. The outer upper armature of relay 712 is connected to grounded battery and its back contact is connected by conductor 723 to the No. 7 contact of the first contact bank. The outer upper armature of relay 713 is connected to grounded battery and its back contact is connected by conductor 724 to the last contact of the first contact bank of stepping switch 709. Relays 752 and 753 are connected to conductors 723 and 724 respectively in the same manner that relay 751 is connected to conductor 722.

Stepping switch 709 is different from stepping switches heretofore described in this specification in that its brushes are double-ended and do not return to normal position by movement which is in a direction opposite to the direction of advancement, under the control of a release magnet, but are unidirectional in operation.

The inner upper armatures of relays 711, 712 and 713 are connected to ground and their front contacts are connected in multiple to a conductor 726 which extends to one terminal of stepping magnet 727 of stepping switch 709. The other terminal of the stepping magnet is connected through interrupter contacts of the stepping magnet to the contact brush associated with the first bank of contacts of the stepping switch. With relay 712 energized, battery is disconnected at the outer upper armature and back contact from the No. 7 contact of the first contact bank and battery remains connected to all other contacts in the bank. At the inner upper armature ground is connected to conductor 726 and the energizing circuit for stepping magnet 727 is completed through the brush and whichever one of the contacts of the first bank the brush happens to be engaging, and through the conductor connected to that contact to grounded battery on the outer upper armature of the relay to which the conductor extends. Stepping magnet 727 becomes energized and interrupts its energizing circuit by means of its interrupter contact whereupon the stepping magnet releases its armature and the brushes of stepping switch 709 are advanced to the next contact on the back stroke or release of the stepping magnet. The interrupter contacts of the stepping magnet are reclosed as the magnet releases. On the next contact of the first bank, the brush finds a battery connection from the next relay in the series so that stepping magnet 727 is again energized, interrupts its energizing circuit and advances the brushes another step. In this manner the brushes are advanced step-by-step until they have been advanced to the No. 7 contacts. Here the brush associated with the first bank finds no direct battery connection except that supplied through relay 752 because battery has been disconnected from conductor 723 at the outer upper armature of relay 712.

Relay 752 has a high resistance winding which passes insufficient current to energize stepping magnet 727. Thus, the stepping magnet does not reoperate, and the brushes of the stepping switch remain on the No. 7 contacts. Relay 752 operates and remains operated as long as the cord plug remains in jack 702. At its lower armature relay 752 operates the make before break contacts and substitutes the ground on the lower armature for that supplied through the armature and back contact of relay 754, and relay 712 is held energized. At its upper armature and front contact relay 752 completes the energizing circuit for relay 754, which operates and removes ground from the auxiliary contacts of all of the other jacks, so that should any other operator insert a cord plug into a front end jack in disregard of the operated busy lamp, associated with that jack, the relay connected to the other auxiliary contact of the jack, such as relays 711 and 713, will not become energized, and the brushes of the stepping switch will not be disturbed. If two operators should insert plugs into front end jacks about simultaneously, their jack relays will both become energized, all busy lamps except those associated with the two jacks will be lighted, and advancement of the stepping switch brushes will be started. When the brush of the first bank reaches the first of the two bank contacts from which direct battery connection has been removed by a jack relay, the brushes will be arrested, the high resistance relay connected to that contact will be operated, relay 754 will be operated and the other operated jack relay will be released by relay 754, thus lighting the busy lamp of that jack relay to direct the operator to remove the cord circuit plug from the jack, as the connector circuit has been seized at another jack. It will be noted that the conductors 726, 756 and 757 have dotted portions. In the case of conductor 726 the dotted portions indicate that portions of the conductor have been omitted, and that at points in the omitted portions the conductor may receive ground connection through armatures and front contacts of other relays corresponding to the relays 711, 712 and 713. In the case of conductor 756 the dotted portions indicate that ground may be supplied through make before break contacts of other relays corresponding to relays 751, 752 and 753 to auxiliary contacts of other front end jacks. In the case of conductor 757 the dotted portions indicate that the conductor may receive ground for completing the circuit of relay 754 from front contacts and armatures of such other relays corresponding to relays 751, 752 and 753.

The brushes associated with the second and third contact banks are now connected to conductors 714 and 716 through the seventh contacts of the two banks and these brushes are interconnected by an inductance 728 and are individually connected to one terminal of two condensers 731 and 732. The other terminals of condensers 731 and 732 are connected through conductors 733 and 734 and through connecting conductors 833 and 834 in Fig. 8 to the ends of the left-hand winding of a transformer 801 which serves as both input and output at one end of a two-way regenerative repeater shown in Fig. 8. Inductance 728 corresponds in function to inductance 403 in Fig. 4, providing a path for the flow of direct current in conductors 714 and 716 for energizing supervisory relays in the cord circuit, the plug of which is inserted into jack 702, and also serving as a filter in combination with condensers 731 and 732 which in turn block direct current out of the left-hand winding of transformer 801.

Similarly the brushes associated with the fourth and fifth contact banks are interconnected by an inductance 736 and to condensers 737 and 738 from which conductive paths extend over conductors 739 and 741, connecting with conductors 839 and 841 which are connected to the ends of the right-hand winding of a transformer 802 which serves as both input and output for the right-hand end of the two-way repeater shown in Fig. 8. The No. 7 contacts of the fourth and fifth bank of stepping switch 709 are connected by conductors 742 and 743 to the tip and ring contact springs of jack 707 from which connection should be established through a cord circuit to the intertoll trunk circuit over which the communication path is to be extended.

The structure and operation of the regenerative repeater will be described first upon the basis of regeneration of a code signal combination entering the repeater through the left-hand winding of transformer 801 from jack 702. It should be borne in mind that the signals enter the repeater through a cord circuit and that transmission into, through and out of a cord circuit is upon the basis of no current for the marking condition and alternating current trains for the spacing condition. Accordingly in the normal or idle marking condition no current is impressed upon the left-hand winding of transformer 801. The upper right-hand winding of transformer 801 is connected across the input circuit of an amplifier tube 803 which is preferably of the vacuum type. The lower right-hand winding of transformer 801 is connected across the output circuit of a tube 804 also preferably of the vacuum type and it will be apparent that any transfer of signals from the left-hand winding of transformer 801 into the lower right-hand winding will have no effect since the latter winding is in the output circuit of a vacuum tube. Accordingly signals impressed on the left-hand winding of transformer 801 are routed through tube 803 in which spacing impulses of oscillatory current are amplified. The grid circuit of tube 803 includes a resistor for reducing the gain of the tube when the grid becomes positive. Amplified spacing signals are impressed across the left-hand or primary winding of the transformer 806 included in the anode circuit of tube 803. Accordingly, corresponding alternating current is induced in both of the right-hand or secondary windings of the transformer. A bridge type full-wave rectifier 807 is connected across the upper secondary winding of transformer 806 and a condenser 808 shunted by a resistor 809 is connected across the output of rectifier 807. Thus direct current resulting from the rectification of a spacing train of alternating current will result in the charging of condenser 808.

The lower secondary winding of transformer 806 has two half-wave rectifiers connected to the ends thereof to form a full-wave rectifier circuit and the output of this rectifier circuit includes variable resistor 811 and condenser 812 in series. Thus the rectified spacing current will charge condenser 812 through the variable resistor 811. The variable resistor controls the timing of the charging of condenser 812 and thereby serves as an orientation adjustment to permit the most effective part of a received impulse to control the retransmission of a corresponding impulse in regenerated manner. The grid circuit of a hot cathode gas-filled trigger tube 813, the grid of which is normally biased sufficiently negative by battery 814 to prevent firing of the tube, is connected across the condenser 812 and when a sufficient positive charge has been developed across condenser 812 as a result of the rectification of a spacing signal, which will be assumed to be the start impulse of a permutation code signal, the grid of tube 813 will be rendered sufficiently positive to fire the tube. With tube 813 rendered conductive, the potential of its cathode is suddenly rendered considerably more positive with respect to ground due to current through the cathode resistor. The cathode of tube 813 is connected by conductor 816 to the cathode of an amplifier tube 817, the grid circuit of which is connected across the upper left-hand or secondary winding of transformer 802, and which stands in the same relation to transformer 802 that vacuum tube 803 bears to transformer 801, namely, that tube 817 serves to amplify spacing trains of alternating current impressed on the right-hand or primary winding of transformer 802 through jack 707 from a remote station and induced by the primary winding of transformer 802 into the upper secondary winding. By virtue of the interconnection of the cathodes of tubes 813 and 817 through conductor 816, the cathode of amplifier tube 817 is made considerably more positive with respect to ground, thereby increasing the bias on tube 817 well beyond the cut-off point of that tube so that it is rendered completely unresponsive to any spacing signal which might be received over conductors 839 and 841 from a remote station. Any attempted transmission of signals through the repeater in the opposite direction from that now being considered is prevented.

The cathode of gas-filled tube 813 is also connected through condenser 818 and conductor 819 to the cathode of a hot cathode gas-filled trigger tube 822 which is at this time conducting, not because its grid is above the firing potential but because its grid was previously raised momentarily above the firing potential, as will be later described, and it is a characteristic of such tubes that having been fired, they cannot be cut off by reducing the potential of the grid but can only be quenched by opening the external circuit between the anode and cathode or in some other manner reducing the potential difference between the anode and the cathode. Due to the raising of the potential of the cathode of gas-filled tube 813 above ground, an impulse is applied through condenser 818 and conductor 819 which momentarily makes the cathode of tube 822 more positive with respect to ground than it had previously been, thus reducing the potential difference between the cathode and the anode to a value less than sufficient to sustain current between the anode and cathode so that tube 822 is rendered non-conductive.

The anode circuit of gas-filled tube 822 includes a tapped primary winding of a transformer 823 which is tuned by a condenser 824, and a portion of which is connected between the grid and cathode of an electron discharge tube 826, with the remainder of the transformer primary connected between the cathode and anode of that tube. This will be recognized as an electron tube oscillator circuit and the constants of the primary of the transformer 823 and of condenser 824 are such that the frequency of oscillation is equal to one cycle per impulse interval of a permutation code signal. When gas-filled tube 822 is conducting, the flow of its anode current through the primary winding of transformer 823 prevents tube 826 from generating oscillatory current. However, when tube 822 is rendered nonconductive the oscillator circuit comprising tube 826, transformer primary 823 and condenser 824 begins to oscillate, and its circuit constants are such that it begins substantially at the zero point of the voltage wave substantially without a transient.

The oscillator voltage is impressed on the grid of tube 829 through the secondary winding of transformer 823 poled so that the grid becomes less positive during the first half of the wave. Tube 829 flashes at a part of the wave which is predetermined by the circuit constants. The anode of tube 829 is connected through conductor 831 to one terminal of a condenser 832, the other terminal of which is connected to the anode of a hot-cathode gas-filled trigger tube 836. Upon the firing of tube 829, an impulse is delivered through the condenser 832 which reduces the potential of the anode of tube 836 and if this tube has been conducting, it is quenched. The anode circuit of tube 829 includes the primary winding of a transformer 837 which has a plurality of secondary windings. The primary of transformer 837 is shunted by a condenser 838. The condenser 838 delays the building up of a flow of anode current through the primary of transformer 837 until after tube 829 has quenched tube 836 if the latter has been conducting. By the time such quenching action has been accomplished, a sharply peaked impulse passes through the primary winding of transformer 837 and induces a similar impulse in the secondary winding 839. One terminal of secondary winding 839 is connected through biasing batteries to the cathode of gas-filled tube 836 and the other terminal of the secondary winding 839 is connected to one terminal of condenser 808 which together with resistor 809 in shunt therewith is connected across the output of full-wave rectifier 807. The other terminal of condenser 808 is also connected to the grid of gas-filled tube 836. The polarity of the impulse generated in transformer secondary 839 is in series-aiding relation to the charge impressed on condenser 808 as a result of rectification of the received start impulse which, being of spacing nature, is represented by received alternating current and the potential across the transformer secondary 839, added to the potential across condenser 808 is sufficient to fire gas tube 836. The reason that tube 829, upon firing, was able to quench tube 836 through condenser 832, although a potential was then being developed across condenser 808 due to the rectification of the start signal is that the voltage which can be developed across condenser 808 by rectifier 807 is insufficient to fire tube 836. It may also be added that the voltage developed across transformer primary 839 is insufficient to fire tube 836 except when aided by a voltage across condenser 808. Thus the tube 836 can be fired only when a spacing train of alternating current is being received and rectified and can be fired only under the timing control of transformer 837.

The cathode of tube 836 is connected by conductor 837 to the grid of an amplifier tube 838. Tube 838 has a source of alternating current 846 generating oscillatory current at the signaling frequency connected from cathode to ground. When tube 836 is non-conductive, a steady negative bias is applied to the grid of vacuum tube 838 so that the tube is biased well below the cut-off point and even the positive swing of the alternating current from source 846 will not raise the potential of the grid of tube 838 sufficiently to render the tube conducting. However, when tube 836 becomes conductive the potential of the grid of tube 838 is raised sufficiently that tube 838 is rendered conductive, the conductivity being varied in accordance with the control of the cathode potential by the source of oscillatory current 846 and the tube will thus serve as an amplifier of the oscillatory current at the signaling frequency. The anode circuit of tube 838 includes the lower left-hand winding of transformer 802 so that there will be induced in the right-hand winding and transmitted over conductors 838 and 841, 739 and 741, to the cord circuit connected to jack 707, a train of oscillatory spacing current representing the start signal. The duration of this start signal will not be dependent upon reception of a start signal of effective amplitude during the entire start signal interval, since the gas-filled tube 836, having been rendered conductive in consequence of the charging of condenser 808 due to reception of a start signal, at least a portion of which is of effective amplitude, cannot be quenched by grid control even though the received start signal may trail off to insignificant amplitude before the end of the start signal interval, due to distortion. Tube 836 can be cut off only by tube 829 under the control of oscillator tube 826 in a manner heretofore described, whereby there will be allotted to the transmission of the start signal by tube 838, a full start signal interval, which will be recognized as constituting regeneration of the signal.

It will be observed that the cathode return circuit of tube 829 includes a resistor 848 shunted by a condenser 849. Upon the firing of gas-filled tube 829 under the control of oscillator tube 826, the inductance of the primary winding of transformer 837 through which the anode current of tube 829 flows causes condenser 849 to become charged to such potential that the potential difference between the anode and cathode of tube 829 is reduced below the value at which a discharge may be maintained, and tube 829 is quenched. Following the quenching of the tube condenser 849 discharges through resistor 848 which retards the discharge so that tube 829 has time in which to deionize before condenser 849 has completely or almost completely discharged and has thus restored the normal potential difference between the anode and cathode of tube 829. The actual time of firing of tube 829 is just after the oscillator voltage has begun to rise above zero in the positive half cycle. Tube 829, upon being quenched by condenser 849, remains non-conductive under the control of the condenser, due to its slow discharge, until after the oscillator has entered its negative half cycle. Accordingly tube 829 does not refire in the same positive half cycle, but awaits refiring in the next positive half cycle. As previously stated, the oscillator is adjusted to produce one cycle per impulse interval of a permutation code combination. Thus for each cycle of the oscillator, tube 829 is rendered conductive and remains so only momentarily due to the self-quenching effect of condenser 849, so that a succession of impulses is produced with a time interval between each two impulses equal to the signaling impulse interval of permutation code signals.

Transformer 837 has other secondary windings designated by the reference numerals 851, 852, 853, 854 and 856. Secondary winding 852 of transformer 837 is connected in the grid circuit of a hot-cathode gas-filled trigger tube 857, so that tube 857 is fired at the same time that tube 836 is fired in response to the first impulse in the primary winding of transformer 837. The cathode of gas-filled tube 857 is connected through secondary winding 853 of transformer 837 to the control anode of the first of six cold-cathode gas-filled electron discharge tubes, the first tube being designated by the reference numeral 858. The cathode of the first cold-cathode tube is connected through secondary winding 854 of transformer 837 to the control anode of the second cold-cathode gas-filled tube 859. The cathode of the second cold-cathode tube 859 is connected to the control anode of the third cold-cathode tube 861 through secondary winding 856 of transformer 837. The cathode of tube 858 is connected to ground through resistor 862 shunted by condenser 863. The cathode of tube 859 is connected to ground through resistor 864, shunted by condenser 866. Other cold-cathode tubes indicated by the dotted line between tube 861 and the final tube 867 have their cathodes connected to ground through individual resistors shunted by condensers, and the final tube 867 has its cathode connected to ground through resistor 868 shunted by condenser 869. The number of cold cathode tubes employed is determined by the number of signal elements in the permutation code, each tube serving to count one element of the code. Each of the cold-cathode tubes except the final tube 867 has its main anode connected to a conductor 871 through a resistor and the final tube has its main anode connected directly to the conductor 871. Conductor 871 is connected through inductance 872 to the positive terminal of battery 873, the negative terminal of which is grounded. From this it will be apparent that the inductance 872 is common to the main anode circuits of all of the cold-cathode gas-filled tubes.

Conductor 871 is connected by conductor 874 to one terminal of a condenser 876, the other terminal of which is connected to the anode of hot-cathode gas-filled tube 813. A condenser 877 is connected between the anode of hot-cathode gas-filled tube 857 and conductor 871 so that when tube 857 is fired substantially simultaneously with tube 836 in response to the start signal, an impulse will be delivered through condenser 877, conductors 871 and 874 and condenser 876 tending to quench tube 813 which is now conductive, it will be remembered, since the start signal now being received and rectified will have raised the potential of the grid of gas-filled tube 813. Such impulse will not be effective to quench tube 813 because it will not be of sufficient amplitude. Tube 813 will remain active until a stronger impulse is impressed upon its plate which occurs when tube 867 flashes, as will be described hereinafter.

With tube 857 rendered conductive, the control anode of the first cold cathode tube 858, being connected to the cathode of tube 857, will be made more positive with respect to ground due to current in the cathode resistor of tube 857. Tube 858 will not fire at this time because condenser 869 delays the change in potential until after the voltage peak in transformer secondary 853 subsides. Upon the next energization of transformer 837, under the control of oscillator 826, the voltage induced in the secondary winding 853 will be added to that already applied to the control anode of tube 858 from the cathode of tube 857 and the aggregate will be sufficient to fire the control gap of tube 858 which will break down the main gap and cause current to flow in the main anode circuit. Due to the presence of the resistor connected between the main anode of tube 858 and conductor 871, the potential of conductor 871 will not be materially reduced as the space discharge potential in tube 858 drops from the firing to the sustaining potential so that no impulse will be impressed on condensers 876 or 877 of sufficient magnitude to quench tubes 813 and 857, respectively.

The firing of tube 858 serves as a tallying or registration of the second cycle of oscillator 826 and results from the second momentary firing of discharge tube 829. At this time the repeater will be receiving the first code impulse of the code combination which will be assumed to be of marking nature, which is represented by a no-current condition in the conductors 733 and 734. The tube 829 upon being momentarily fired, quenches gas-filled tube 836 through conductor 831 and condenser 832. Since the signaling impulse is of marking nature, no alternating current will be impressed upon rectifier 807 and accordingly no voltage will be built up across condenser 808 from the rectifier. Simultaneously with the firing of tube 858, through transformer secondary winding 853, a pulse will be induced in the secondary winding 839 of the transformer which will be impressed on the grid circuit of tube 836. The voltage of this pulse is of insufficient magnitude to fire tube 836 in the absence of a voltage across condenser 808 and accordingly tube 836 will not be fired. With the quenching of tube 836 its cathode became more negative, thus biasing the grid of vacuum tube 838 through conductor 837 to the cut-off point so that oscillatory current from source 846 is withheld from transformer 802 and a no-current condition representing a marking impulse is impressed upon conductors 839 and 841. Had the received first code impulse been of spacing nature, the same as the start impulse, tube 836 would have been quenched momentarily by tube 829 but grid control resulting from the voltage induced in secondary winding 839 of transformer 837 added to the voltage across condenser 808 would have refired the tube. Condenser 847 and resistor 850 associated with the grid circuit of amplifier tube 838 slightly delay the cutting off of tube 838 when tube 836 is quenched, so that when there are successive spacing impulses to be repeated tube 838 will be sustained during the momentary extinguishment of tube 836 and will afford continuity between the two spacing signals.

Gas-filled tube 836 and vacuum tube 838 remain in the condition established under the control of the first code impulse of the code combination until tube 829 is again fired under the control of the oscillator 826 at which time the second code impulse of the signal combination is being received and the second cold-cathode gas-filled tube 859, having had its control anode made more positive with respect to ground due to current through the cathode resistor 862 of tube 858, is fired by the voltage induced in transformer secondary winding 854. Tubes 836 and 838 are conditioned in accordance with the code impulse then being received and the tube 859 registers the fact that this is the second code impulse of the code combination, there being three remaining code impulses to be received followed by the stop impulse which is of marking nature. The reception and retransmission of the remaining code impulses are registered or tallied by the third cold-cathode tube 861 and by the other cold-cathode tubes indicated but not shown.

Upon the actuation of tube 829 following retransmission of the last selecting code impulse, the final cold-cathode gas-filled tube 867 is fired and tube 836 is quenched without fail if it has been conductive for the final code impulse of the code combination, since the stop impulse is of marking nature and there is no voltage across condenser 808 to aid the voltage induced in transformer secondary 839. Accordingly, tube 838 is unfailingly biased to cut-off. The anode circuit of cold-cathode tube 867 differs from the anode circuits of the other cold-cathode tubes in that no resistor is included between the main anode and the conductor 871. At the instant that the main gap of tube 867 becomes conductive, there is no current in the cathode resistor 868 of tube 867 so that no voltage exists across condenser 869. Accordingly, the full voltage between conductor 871 and ground exists between the main anode and cathode of tube 867. However, it is a characteristic of cold-cathode gas-filled tubes that immediately upon firing, the main gap potential decreases to the discharge sustaining potential. Since condenser 869 has not yet had time to absorb the difference between the discharge sustaining potential and the potential which existed between conductor 871 and ground just before tube 867 fired, and there is no resistor between the anode of tube 867 and conductor 871 which can absorb this decrease in potential, it must follow that the potential of conductor 871 with respect to ground is decreased, and such decrease, applied through conductor 874 and condenser 876 to the anode of gas-filled tube 813 quenches that tube and also quenches tube 857 through condenser 877. Also due to the reduction in the potential of conductor 871, the potential of the main anode of each of the other cold-cathode tubes with respect to its cathode is reduced below the discharge sustaining potential so that those tubes are also quenched. The sudden cutting off of current through all but the final one of the cold cathode tubes which have the inductance 872 common to their anode circuit results in a decrease of current through inductance 872 which accordingly develops a counter-electromotive force tending to sustain such current and therefore in series-aiding relation to battery 873. Since the only conductive path for the dissipation of this counter-electromotive force is through the main anode discharge path of tube 867, the anode current in this tube rises to a value above that which would be produced by battery 873 alone and the flow of this current through cathode resistor 868 raises the voltage across condenser 869 to a higher value than would appear across the condenser if the inductance 872 were not present. When the counter-electromotive force in inductance 872 has been dissipated, the voltage between conductor 871 and ground returns to the voltage of battery 873. However, since the condenser 869 carries a larger voltage at this time than it normally would have, the distribution of voltages between conductor 871 and ground is such that the voltage between the main anode of tube 867 and its cathode is below the discharge sustaining potential. Accordingly, tube 867 becomes quenched and condenser 869 then discharges through resistor 868.

The cathode of tube 867 is connected through conductor 881 and condenser 882 to the grid of gas-filled tube 822. Prior to the quenching of tube 867, and while it was conducting anode current, the potential of its cathode was more positive than ground due to the flow of current through the cathode resistor. This more positive potential than ground applied over conductor 881 and through condenser 882 raises the potential of the grid of tube 822 above the firing potential so that tube 822 is rendered conductive as a result of the tallying of the stop impulse and the anode current of tube 822 flowing through the primary of transformer 823, which is the inductive portion of the character timing oscillator, stops the generation of oscillatory current for timing the impulses of a code combination. The oscillator is critically damped and stops substantially without a transient. Thus the regenerative repeater is restored to the initial condition with none of the tubes therein conductive except the tube 822, and the circuit awaits the reception of the next code combination.

When signals are received over conductors 839 and 841 to be repeated in regenerative manner and retransmitted over conductors 833 and 834 such signals are received by transformer 802 and are amplified by tube 817. The anode circuit of tube 817 includes the primary winding of a transformer 886 which corresponds to the transformer 806 and which is provided with two secondary windings. The upper secondary winding works into a full wave rectifier 887, the output of which controls the hot cathode gas-filled trigger tube 888 jointly with impulses supplied from transformer 837 through the secondary winding 851. Tube 888 corresponds to tube 836. The lower secondary winding of transformer 886 has rectifiers associated therewith for charging condenser 889 to control hot cathode gas-filled trigger tube 891 which corresponds to tube 813 and which is effective in response to the start impulse of a code combination for disabling tube 803 which amplifies signals received over conductors 833 and 834, so that there can be no interference with the transmission of a complete code combination.

The impulse timing and counting circuit comprising start tube 822, oscillator 826, oscillator impulse detector tube 829, and counting chain tubes 857, 858, 859, 861 and 867 are common to both of the retransmitting tubes 836 and 888 and to both of the interference preventing tubes 813 and 891, the intercircuit controls previously described being effective over the common conductors 819, 831, and 874.

At the conclusion of message transmission over a long tandem intertoll system involving the use of the regenerative repeater and connector circuit shown in Figs. 8 and 7, respectively, a ten second intertoll disconnect signal initiated at one of the central office stations serving a subscriber whose station participated in the communication will register a disconnect indication in the cord circuit through which the intercommunication path for the subscribers had been established, in the manner previously described. The appearance of the disconnect indication will cause the operator at the tandem central office station to remove the cord circuit plugs from jacks 702 and 707. This results in the release of relay 712. Relay 712 removes ground from the busy lamp conductor 721, thus extinguishing the busy lamps at all multiple appearances of the front end jacks of the connector circuit. Relay 712 also removes ground from conductor 726 in the circuit of stepping magnet 727 and restores battery connection to conductor 723 extending to the No. 7 contact of the first contact bank of stepping switches 709. With the removal of ground from conductor 726 relay 752 is released. This relay removes the substitute ground connection from the auxiliary contact of jack 702 and releases relay 754 which restores the operating ground on its back contact to the auxiliary contacts of all of the front end jacks. The stepping magnet 727 remains unoperated and the brushes remain on the No. 7 contacts of the stepping switch until such time as a cord plug is inserted into a different one of the jacks 701, 702, and 703 whereupon the relay associated with such jack will be energized and the circuit of stepping magnet 727 completed to ground through an armature and front contact of the relay to cause the brushes again to be advanced until the brush associated with the first contact bank reaches a contact from which direct battery has been disconnected, this being the contact associated with the energized relay. From this it will be apparent that the brushes of stepping switch 709 have no normal position but remain where last used until they are again advanced to find a new position. The removal of the cord circuit plugs from the connector circuit jacks has no effect upon the regenerative repeater circuit because the no-current condition of the repeater input circuit is the normal or idle condition and the repeater remains inactive with only the tube 822 conductive.

An embodiment of the invention now to be described is that exemplified in Fig. 16 for interconnecting a local subscriber's station equipped to transmit and receive alternating current signals with a toll subscriber's station equipped to transmit and receive direct current signals through a central office station serving both of the subscribers' stations and in which signal conversion from alternating current to direct current and conversely takes place in the cord circuit through which the two subscribers' stations are interconnected.

*Cord circuit for interconnecting alternating current station and direct current station*

The cord circuit and associated operator's set and supervisory apparatus are shown in Figs. 9 and 3, and the cord circuit itself is contained in Fig. 9. The portion of the cord circuit which is adapted to cooperate with an alternating current subscriber's line circuit is that shown in the left-hand portion of Fig. 9 including the left-hand side of the splitting key. This portion of the cord circuit is identical with either half of the cord circuit shown in Fig. 2 and the description will not be repeated. Four-digit reference numerals have been applied to elements in Fig. 9 which correspond to elements in Fig. 2, the reference numerals being the same as those contained in Fig. 2, with the addition of the numeral 9 preceding them. Thus the description of Fig. 2 may be read upon Fig. 9 to all common subject-matter by disregarding the first digit of all four-digit reference numerals in Fig. 9.

Starting at the right-hand half of the splitting key 9208, the swingers of that half of the key are connected to the armatures of a relay 901 which has no counterpart in the trunk circuit shown in Fig. 2. The back contacts of relay 901 are interconnected through condenser 902 and resistor 903 in series which provide a closed circuit for alternating current signals when relay 901 is deenergized. The upper front contact of relay 901 is connected through conductor 904, the primary winding of a transformer 906 and conductor 907 to the marking contact of a biased polar relay 908. The lower front contact of relay 901 is connected by conductor 909 to the armature of relay 908. From this it will be apparent that when relay 901 is energized and relay 908 is in the marking condition, there will be a closed circuit through the primary winding of transformer 906 into which closed circuit alternating current signals may be introduced from a subscriber's line circuit through the tip and ring of plug 9201 and through condensers 9206 and 9207, or from the operator's set shown in Fig. 3 through conductors 9232 and 9233 and through key 9231 after that key has been operated to close the make contacts thereof.

The secondary winding of transformer 906 is connected to the grid circuit of an amplifier tube 911, the anode circuit of which includes the primary winding of output transformer 912. The secondary winding of transformer 912 is center-tapped and the ends of the winding are connected to two half-wave rectifiers 913 and 914. The output terminals of the two rectifiers 913 and 914 are connected to one end of the operating winding of a biased polar sending relay 916, the other end of which is connected to the mid-point of the secondary winding of transformer 912. This arrangement for operating relay 916 is comparable with the arrangement in Fig. 6 for operating the sending relay 604 including the secondary winding of transformer 609 and the half-wave rectifiers 611 and 612. Since alternating current signaling in the cord circuit is on the basis of no current for the marking condition and trains of alternating current for spacing impulses as previously set forth, tube 911 is normally biased to cut-off so that no current flows in its anode circuit and the armature of relay 916 is held to its marking contact by current through the biasing winding. When a spacing impulse of alternating current is amplified by tube 911, the rectifier circuit comprising rectifiers 913 and 914 rectifies the output of amplifier tube 911 and passes direct current through the operating winding of relay 916 which overcomes the biasing winding and moves the armature of the relay to the spacing contact. The armature of relay 916 is connected to grounded battery and the marking contact of the relay is connected through the operating windings of relays 908 and 917, the normally closed contacts of subscriber ringing key 918 to the tip of plug 919. The biasing windings of relays 908, 917, are connected in series in a circuit from grounded battery 921 through resistors 922 and 923 in series, biasing windings of relays 908 and 917 to ground. Current in the biasing windings of these relays seeks to operate their armatures to the spacing contacts but this tendency is overcome by current in the operating windings when plug 919 is inserted into a toll subscriber's line termination circuit jack to complete a connection to such subscriber's station. The relays 908 and 917 have been shown in the marking position although they would not be in the marking condition until plug 919 is inserted into a jack. The spacing contact of sending relay 916 is connected to the point of interconnection of resistors 922 and 923 so that when relay 916 goes spacing in response to a spacing signal, the armature battery of relay 916, which has the opposite pole grounded as compared with battery 921, is connected to the left-hand terminal of the biasing winding of relay 908. This reverses the flow of current through the biasing windings of relays 908 and 917 and causes those windings to hold the armatures on the marking contacts. Were it not for this reversal of the current through the biasing windings, relays 908 and 917 would go to spacing when relay 916 is operated to spacing because current through the operating windings of the relays is interrupted at the marking contact of relay 916 when this relay goes spacing. The reversal of the current in the biasing windings of relays 908 and 917 prevents the reflection of a spacing signal received from the left-hand end of the cord circuit back into that portion of the circuit since the relay 917 upon operating to the spacing position transmits a spacing train of alternating current toward the left-hand end of the cord circuit as will now be described.

Conductor 904 in addition to being connected to the upper terminal of the primary winding of transformer 906 is also connected by conductor 926 to one terminal of an inductance 927 which has connected in shunt therewith a source of alternating current 928. The other terminal of inductance 927 is connected through inductance 929 to the armature of relay 917 and to one terminal of a resistor 931. The other terminal of resistor 931 is connected to the spacing contact of relay 917 and to conductor 909. The marking contact of relay 917 is connected to conductor 926. Since the operating windings of relays 908 and 917 are in series and the biasing windings are in series, these relays operate in unison both being in the marking condition or both being in the spacing condition under signal control. With these relays in marking condition, relay 908 completes the circuit of the primary of transformer 906 as previously described and relay 917 places a short-circuiting connectio across the series of two inductances 927 and 929 thus confines the alternating current generated by source 928 to the two inductances and prevents it from being impressed on conductors 904 and 907 through conductor 926 and resistor 931, respectively. When relays 908 and 917 go to spacing, the relay 917 removes the short-circuiting connection across the inductances and short-circuits the resistor 931. Thus an alternating current signal is impressed across conductors 904 and 909 through conductor 926 and the armature and spacing contact of relay 917, respectively, and this signal is passed through the armatures of relay 901 to the splitting key 9208 whence it goes to plug 9201 and to the operator's set if key 9231 is operated. Relay 908 opens the circuit through the primary of transformer 906 and thus prevents the alternating current signal from being reflected back to plug 919 through rectifiers 913 and 914 and relay 912.

*Toll subscriber's line termination circuit*

Fig. 10 shows a toll line termination circuit with which the right-hand portion of the cord circuit shown in Fig. 9 is adapted to cooperate; and Fig. 11 shows a toll subscriber's station to which a single line conductor extends from the line termination circuit shown in Fig. 10, the return path for signals being through ground. The toll line termination circuit and toll subscriber's station shown in Figs. 10 and 11, respectively, are substantially identical with toll line termination and subscribers' station circuits shown in Patent 2,143,000, granted January 10, 1939, to W. W. Cramer et al. The disclosure of this patent is incorporated herein by reference as part of the present specification and in view of the fact that those circuits are fully described in the patent, the description of them in the present specification will be somewhat abbreviated. In the toll line termination circuit the relays are shown in their normal positions by which is meant the position assumed by the relays when the circuit is idle. Jack 1001 which is adapted to receive plug 919 of Fig. 9 has its tip spring connected to the outermost upper front contact of a relay 1002. From the outermost upper armature of relay 1002 a conductive path extends through the operating winding of a biased polar relay 1003, the back contact and upper armature of a relay 1004, the operating winding of a biased polar relay 1006, and the armature of a relay 1007 to negative battery on the right-hand or marking contact of the last-mentioned relay. The conductive path of the line conductor extending to the subscriber's station is traced from ground on the upper back contact of relay 1008, through the upper armature of that relay, winding of relay 1009, choke coil 1011, operating winding of relay 1007, upper winding of biased polar relay 1012 to the line conductor 1013.

The other end of the line conductor is indicated 1113 in Fig. 11 and extends through subscriber's recall key 1101, test key 1102, armature and back contact of relay 1103, to one terminal of ringer 1104, the other terminal of which is connected through a condenser to ground.

In the toll line termination circuit of Fig. 10, relays 1007 and 1012 are normally maintained on their marking contacts by current flowing in a circuit from ground on the back contact associated with the outer upper armature of a relay 1014, through the armature, the lower winding of relay 1007, middle winding of relay 1012, to battery on the movable make-before-break contact associated with the inner upper armature of relay 1014. Relay 1006 is also maintained on its marking contact by current flowing in a circuit from ground through resistance 1016, the lower or biasing winding of relay 1006 to battery on the fixed contact engaged in make-before-break manner by the movable front contact associated with the upper armature of relay 1017. Relay 1003 usually remains on its marking contact as shown in Fig. 10 during idle intervals but may not be so positioned during this time since the circuit of its biasing winding is open at the middle upper armature and front contact of relay 1002.

The sleeve of jack 1001 is connected to ground through the winding of relay 1002. The sleeve of plug 919 (Fig. 9) is connected by conductor 932 through the winding of relay 901 to grounded battery. Thus when plug 919 is inserted into jack 1001, relays 901 and 1002 become energized in series, the relay 901 extending a communication path from the right-hand portion of splitting key 9208 through the primary winding of transformer 906 as previously described. Relay 1002, upon being energized, attracts its four armatures. The operation of relay 1002 extends the transmission circuit from the tip of plug 919 through the tip spring of jack 1001, the uppermost front contact and armature of relay 1002, the upper winding of relay 1003, the back contact and upper armature of relay 1004, and the upper winding of relay 1006 to the armature and marking contact of relay 1007. At the middle upper armature and front contact of relay 1002, the circuit of the lower or biasing winding of relay 1003 is completed. The magnetic effect produced by current in the biasing winding of relay 1003 seeks to move the armature to the spacing position but is unable to do so except when the operating winding of relay 1003 is deenergized, which condition occurs, for example, when relay 916 goes to the spacing condition and disconnects battery from the tip of plug 919 or when relay 1007 goes to the spacing position and places the positive battery on the spacing contact in opposition to positive battery on the armature of relay 916 (Fig. 9). At its innermost upper armature and front contact, relay 1002 prepares a circuit, which is at this time open at the front contact and grounded lower armature of relay 1008, for relay 1014 which is connected to grounded battery. At the lower armature and front contact of relay 1002, positive battery is connected over conductor 1018 to the marking contact of relay 1012.

With plug 919 inserted into jack 1001, a third circuit is completed through the jack and plug from grounded battery on relay 934, through the winding of the relay and in parallel therewith from grounded battery on the lower armature of relay 934, through the lower back contact of that relay, winding of relay 936, movable front contact and stationary contact associated with the lower armature of relay 936, conductor 933, the ring of plug 919 and ring spring of jack 1001, conductor 1019, the back contact and lower armature of a relay 1021, and back contact and lower armature of relay 1008 to ground. Relay 934 is slow to operate so that relay 936 becomes operated first and at its lower armature interrupts the ground supplied over conductor 933 but supplies a substitute ground from the lower break contacts of the operator's set key 9231 unless that key is at this time operated in which case relay 936 may tend to vibrate. However, as soon as relay 934 becomes operated, it disconnects battery at its lower armature from the winding of relay 936 so that that relay is released. At the upper armature and front contact of relay 934, ground is connected to lamp 937 which lights and remains lighted as long as relay 934 remains energized. This lamp will be extinguished when the called subscriber has been rung and has answered as will be described later.

The toll line termination circuit is now prepared for the transmission of ringing current to the toll subscriber's station. This is accomplished by the operation of key 918 in Fig. 9 to the off-normal position. At the left-hand make contacts of key 918 battery is connected for holding the operating windings of relays 908 and 917 energized and at the right-hand make contacts ringing current, which usually is alternating current at a frequency of 20 cycles per second, is connected from source 938 to the tip of plug 919 and thus to the communication circuit path which terminates at the armature of relay 1007. Relays 1003 and 1006 may respond to this ringing current but perform no useful function at this time. A branch circuit extends from the outermost upper armature of relay 1002, through conductor 1023, the inner lower armature and back contact of relay 1014 and through the winding of an alternating current relay 1024 to one terminal of a condenser, the other terminal of which is connected to ground. Relay 1024 responds to the ringing current over the circuit just traced, completing the energizing circuit for a relay 1026 which operates. Relay 1026 in operating completes a circuit from ground through the lower armature and back contact of relay 1008, the lower armature and back contact of relay 1021, lower armature and front contact of relay 1026, to relay 1027. Relay 1027 at its lower armature and front contact completes the energizing circuit for a relay 1028 which operates to disconnect the line conductor 1013 from the upper winding of relay 1012 and to connect it instead to the upper armature of relay 1027 which now is connected through its front contact to source of ringing current 1029. Ringing current is thus transmitted over line conductors 1013 and 1113 to operate ringer 1104 at the subscriber's station.

The three upper armatures of relay 1026 are arranged to complete the charging circuit for a condenser 1031 which is connected between the control anode and the cathode of a discharge tube 1032, to complete the conductive path from the anode of tube 1032 to the winding of relay 1021 and to prepare a holding circuit for the relay 1021 independently of the discharge tube 1032, which becomes non-conductive after operating relay 1021, and condenser 1031 is discharged when relay 1021 operates. The purpose in providing relay 1021 to be operated under the control of tube 1032 is to provide for the starting of an unattended subscriber's station under the control of steady ringing for a relatively long interval of predetermined length. The operation of the system for starting an unattended station is fully described in the Cramer et al. patent. If the operator closes the ringing key 918 for short intervals, to provide intermittent ringing, relays 1024, 1026, 1027 and 1028 will be released upon each cessation of ringing and the relay 1026 in being released will restore ground connection to condenser 1031 so that tube 1032 will not be fired by such intermittent ringing.

Toll subscriber's station

At the subscriber's station, the relay 1106 and a series of relays controlled by it is provided for starting the station on an unattended basis. Assuming that the operator rings intermittently and does not attempt to start the subscriber's station on an unattended basis, the subscriber can start the station by closing key 1107 which connects a source of power 1108 to the winding of relay 1103, to operating motor 1109 for a teletypewriter receiver and transmitter, and to a rectifier 1111 for supplying direct current signaling potentials. The relay 1103 disconnects the line conductor 1113 from ringer 1104 and connects it instead through the operating winding of biased polar receiving relay 1112, choke coil 1115, to the armature of transmitting relay 1116. The circuit of the operating winding of relay 1116 extends from the negative terminal of rectifier 1111 through the left-hand or operating winding of the relay 1116, the right-hand or operating winding of a second biased polar transmitting relay 1117, conductor 1126, normally closed contacts of test key 1102, teletypewriter transmitting contacts 1118, and break key 1119 to the positive terminal of the rectifier. When the circuit just described is closed, the armatures of both of the transmitting relays 1116 and 1117 are on their marking contacts. The armature of relay 1117 is connected through a choke coil to ground. The marking and spacing contacts of the relays 1116 and 1117 are connected to the output of rectifier 1111 in a commutating arrangement so that when the relays are in the marking condition the negative terminal of the rectifier is connected through the armature of relay 1116 to line conductor 1113 and the positive terminal of the rectifier is connected to ground, whereas when the transmitting relays are in the spacing condition, the positive terminal of the rectifier is connected through the armature of relay 1116 to the line conductor and the negative terminal is connected to ground.

With the closure of starting key 1107 by the attendant and consequent energization of relays 1116 and 1117 in their marking condition, current flows from the negative terminal of the rectifier through the armature of relay 1116, choke coil 1115, the operating winding of relay 1112, the front contact and armature of relay 1103 now energized, line conductors 1113 and 1013, armature and back contact of relay 1028, the upper windings of relays 1012 and 1007, choke coil 1011, the winding of relay 1009 and the upper armature and back contact of relay 1008 to ground. Current also flows at the subscriber's station (Fig. 11) from the negative terminal of the rectifier through the armature of relay 1116, the selector magnet 1121 of the teletypewriter, the varistor 1122, marking contact and armature of relay 1112, to ground through break contacts of the test key 1102.

Current in the winding of relay 1009 causes that relay to become energized. Relay 1009 completes a circuit from grounded positive battery through a resistor to which the spacing contact of relay 1012 is connected, the armature and front contact of relay 1009, winding of an alternating current relay 1033, to ground through the marking contact and armature of relay 1012. As pointed out previously, relay 1012 is maintained on its marking contact at this time by current flowing through its middle winding. This causes relay 1033 to operate which in turn operates relay 1008. Relay 1008 in operating transfers the circuit of line conductor 1013 from direct ground on its back contact to its front contact and thence through the armature and marking contact of relay 1006 to ground. Relay 1008 at its lower armature disconnects ground from the circuit extending through the ring circuit of jack 1001 and plug 919 to relay 934, thereby releasing the relay and extinguishing lamp 937, and transfers the ground connection to the windings of relays 1014 and 1017 which become energized. The extinguishment of lamp 937 is a signal to the operator that the called subscriber has answered and that the intermittent transmission of ringing current should be discontinued. It should be noted that relay 1009 cannot be energized to bring in the indication that the subscriber has answered during a ringing interval because relay 1028 is energized in such interval and holds line conductor 1013 disconnected from the circuit of relay 1009. This explains the ringing of an attended subscriber's station upon an intermittent basis.

Relay 1014 in operating disconnects the previously traced circuit through the lower winding of relay 1007 and the middle winding of relay 1012 and connects those windings to the transmission circuit of line conductor 1013 between choke coil 1011 and the upper winding of relay 1007. These windings are now connected between the transmission circuit line 1013 and the artificial line comprising condenser 1036 and resistor 1037 to ground. It should be noted that the artificial line does not provide any direct current path. No biasing current is required for the receiving relays 1007 and 1012 because they receive positive and negative signaling impulses of current of substantially the same magnitude from the subscriber's station. In the case of signal transmission to the subscriber's station, the relay 1006 connects ground for the marking condition and positive battery for the spacing condition which battery is in series aiding relation to the potentials at the subscriber's station during reception, so that current for marking and for spacing signals is in the same direction, namely, the marking direction with respect to relays 1007 and 1012, so that they are held to the marking condition even more firmly during spacing impulses transmitted to the subscriber's station than during marking impulses.

The operation of relay 1014 also interrupts the operating circuit of ringing relay 1024 and prepares a circuit for the operation of relay 1036, and also connects battery to the upper terminal of condenser 1031 through high resistance 1029 and the middle upper back contact and armature of relay 1026. However, ground is connected to the upper terminal of condenser 1031 through the marking contact and armature of relay 1003 and the middle upper back contact and armature of relay 1026 so that condenser 1031 will not become charged as long as relay 1003 remains in the marking condition.

The operation of the relay 1017 connects the lower winding of relay 1006 to the transmission circuit extending through jack 1001, so that current through that winding will be reversed each time the polarity connected to the right-hand terminal of the upper winding is reversed by operation of the armature of relay 1007, so that relay 1006 will not follow and repeat back toward the subscriber's station signals received therefrom and repeated by the relay 1007 toward the cord circuit. The relay 1017 also completes a circuit including condenser 1041 and resistor 1042 in parallel with the contacts of relay 1009.

This completes the preparation of a communication path from the cord circuit shown in Fig. 9 to the subscriber's station shown in Fig. 11, and the energization of all necessary supervisory relays. Alternating current signals generated in the subscriber's station shown in Fig. 1 will be converted to direct current signals in the right-hand portion of the cord circuit shown in Fig. 9 and the relays 1003 and 1006 will be operated in accordance with these signals. Relay 1003 follows the signals for supervisory purposes and its armature will not be out of the marking position during the transmission of message signals long enough for condenser 1031 to become charged to the point where it will fire the electron discharge tube 1032. Relay 1006 will repeat the signals to the line conductor comprising conductors 1013 and 1113 by providing flow of current to ground on the marking contact for the marking condition and by providing flow of increased current in the same direction from the battery on the spacing contact in series aiding relation to the source of potential at the subscriber's station shown in Fig. 11 for the spacing condition. Relays 1007 and 1012 will not follow these signals because there is no reversal of current through their operating windings. At the toll subscriber's station the relay 1112 will follow the received signals, opening the circuit through varistor 1122 and selector magnet 1121 for the spacing condition and reclosing the circuit to permit a flow of current for energizing selector magnet 1121 for the marking condition.

Signals generated by the transmitting contacts 1118 at the toll subscriber's station will be represented by reversals of polarity applied through the operating winding of relay 1112 to the line conductors 1113 and 1013. Relay 1112 will not follow these reversals because it is biased in such a way as to move to spacing position only when the battery on the spacing contact of relay 1006 is placed in series aiding relation to the source of potential at the toll subscriber's station. Selector magnet 1121 will be deenergized in response to a spacing signal generated by the relays 1116 and 1117 because the varistor 1122 is so connected as to present high resistance to a flow of current from the positive terminal of rectifier 1111 through the armature of relay 1116 to the winding of selector magnet 1121.

Relays 1012 and 1007 will be operated in accordance with direct current signals received over line conductor 1013 from the toll subscriber's station, the relay 1012 operating for supervisory purposes and the relay 1007 operating to repeat the signals toward the tip spring of jack 1001 by reversing the polarity of battery applied to the armature of relay 1007. When that relay is in the spacing condition, the battery connected through to the cord circuit is in opposition to the battery connected to the armature of relay 916 in the cord circuit so that current is cut off in the operating windings of relays 908 and 917 which go to spacing and transmit a spacing signal of alternating current toward the alternating current subscriber's station.

During the transmission of telegraph signal impulses from the toll subscriber's station shown in Fig. 11, relay 1033 is maintained operated either from the contacts of relay 1009 or by relay 1012 reversing the charge on condenser 1041 through resistor 1042 and the winding of relay 1033. Relay 1009 will be held operated on the longer signal impulses and on steady state marking or spacing currents received from the toll subscriber's station but may not remain operated during the transmission of telegraph signal impulses. Relay 1012 on its marking position connects ground to the left-hand terminal of relay 1033 and relay 1009 when energized connects battery to the right-hand terminal of relay 1033. With the circuit of relay 1038 prepared by operation of relay 1014, but not yet energized, when relay 1009 releases, charging current for condenser 1041 flows from the battery connected through a resistor to the spacing contact of relay 1012, and through the lower armature and front contact of relay 1017, condenser 1041 and resistor 1042 and winding of relay 1033 to the marking contact of relay 1012 and through the armature of that relay to ground. Consequently condenser 1041 is charged in the circuit through the winding of relay 1033 and the relay remains energized. When relay 1012 moves to its spacing contact, ground is connected from the armature of relay 1012 through the lower armature and front contact of relay 1017, condenser 1041 and resistor 1042, winding of relay 1033, conductor 1018 and lower armature and front contact of relay 1002 to grounded battery. Thus condenser 1041 discharges and recharges in the opposite direction and the discharging and recharging current flowing through relay 1033 holds that relay energized because the relay 1033 is an alternating current relay and attracts its armature regardless of the direction of flow of current through its winding. When relay 1012 again operates to its marking contact the charge on condenser 1041 will again be reversed through the winding of relay 1033 as described above. This rapid reversal of charge on condenser 1041 as relay 1012 follows signals received from the toll subscriber's station provides, in effect, an alternating current for maintaining relay 1033 energized even though relay 1009 releases, while rapid telegraph signal reversal of current is being received, and remains released. Relay 1033 is arranged to hold operated on direct current as are most alternating current relays so that during the time no signal impulses are received over line conductor 1013, during which time relay 1012 will remain on one or the other of its contacts, and thus cause no alternating current to flow through the winding of relay 1033, relay 1009 will be energized and will provide a direct current path through relay 1033 and thus maintain it operated.

Relay 1008, which is operated by relay 1033, is a slow-release relay which further serves to protect the circuit arrangement from false supervisory signal indication due to any momentary releases of relay 1033 which might occur between the time either relay 1012 or relay 1009 is holding relay 1033 operated and the time the other of said relays operates and maintains relay 1033 operated.

Relay 1012 is provided with a third winding in addition to the two windings similar to the windings of relay 1007. The third or lower winding is connected to the contacts of relay 1012 in such manner that an additional or biasing current flows through this winding in such direction as to maintain the armature of relay 1012 on the contact on which it is resting. In other words, this winding tends to make relay 1012 less sensitive than relay 1007 in order to prevent false operation of relay 1012 on crossfire currents and other interference received during the time line 1013 is open-circuited or has no potential connected to it at the toll subscriber's station.

*Toll subscriber's recall*

The manner in which a subscriber having alternating current signaling facilities may recall the operator has been previously described. The toll subscriber may recall the operator by momentarily opening the recall key 1101. This disconnects the source of potential at the toll subscriber's station from line conductor 1113, thus releasing relay 1009 providing relay 1006 is on its marking contact. The reason that relay 1009 may not release if relay 1006 is in the spacing condition is that the line leakage resistance of line 1013 to ground may be such as to permit sufficient current to flow from the battery on the spacing contact of relay 1006 to hold relay 1009 energized even though the line is open at the recall key 1101 at the toll subscriber's station. However, when relay 1006 is on the marking contact, the line 1013 is connected to ground in the toll line termination circuit and no current will flow so that relay 1009 will release. If relay 1006 is in the spacing condition at the time recall key 1101 is operated, and tends to remain in that condition under the control of a spacing signal received from the cord circuit, other circuits fully described in the Cramer et al. patent function after a given time interval to operate relay 1006 periodically to its marking position to permit the release of relay 1009. Relays 1007 and 1012 remain on the contact to which they had been last operated before the opening of recall key 1101, because actual reversals of current through their operating winding are necessary to shift them to the opposite contacts.

With relays 1007 and 1012 remaining on a given contact and relay 1009 released, relay 1033 will release and will release relay 1008 which in turn releases relays 1014 and 1017. When relay 1008 releases it connects ground to the ring spring of jack 1001 through its lower armature and back contact, thus completing the energizing circuit for relays 934 and 936 in Fig. 9. Since relay 934 is slow operating, relay 936 becomes energized first and completes its holding circuit to ground on the lower break contacts of operator's key 9231. Relay 936 connects ground through an interrupter device 941, upper armature and front contact of relay 936, back contact and upper armature of relay 934 to lamp 937, which is caused to flash in accordance with the interruption produced by interrupter device 941. The recall key 1101 should not be held open long enough to permit relay 934 to become operated, as this would cause the energizing circuit for relay 936 to be released and would cause the completion of a steady circuit for lamp 937 which represents a different supervisory indication. Upon the reclosure of recall key 1101, relays 1009, 1033, 1008, 1014 and 1017 become reenergized to restore the toll line termination circuit to the previous condition, but relay 936 remains energized to cause lamp 937 to flash until the operator interrupts the holding circuit for relay 936 by operating key 9231 to answer the toll subscriber's recall signal.

A break signal is transmitted from the toll subscriber's station by the operation of break key 1119 for a prolonged interval. This key short-circuits the transmitting contacts 1118 and opens the circuit of the operating windings of transmitting relays 1116 and 1117 so that these relays transmit a steady spacing condition while break key 1119 is held operated. In response to the prolonged spacing signal, relays 1007 and 1012 go to spacing upon the first engagement of the armature of relay 1006 with its marking contact following the operation of break key 1119. Since a break signal is transmitted for the purpose of interrupting signal transmission from the remote station, relay 1006 will usually be following signals received from the remote station at the time that break key 1119 is operated. If relay 1006 is on the spacing contact at the time break key 1119 is operated, the source of potential at rectifier 1111 will be placed in series opposition to the battery on the spacing contact of relay 1006. As is fully set forth in the Cramer et al. patent, the system of signal transmission employed between the toll subscriber's station and the toll line termination circuit contemplates that the potential of the battery connected to the spacing contact of relay 1006 shall be substantially twice the potential of rectifier 1111. Thus with rectifier 1111 connected in opposition to the battery on the spacing contact of relay 1006, there will be a potential applied through the line extending to the toll subscriber's station to ground on the armature of relay 1117 which is equal to the potential of rectifier 1111 and is of the same polarity as that applied when relays 1116 and 1117 are in the marking condition and relay 1006 is in the marking condition. Thus the relays 1007 and 1012 will not go to spacing until relay 1006 has gone to marking under signal control from the remote subscriber's station. Relay 1009 holds energized on the spacing current and relay 1007 repeats the spacing signal through the tip spring of jack 1001 to relays 908 and 917 in the cord circuit which go to spacing, and the relay 917 transmits a spacing signal to the subscriber's station in Fig. 1 which is connected to jack 9201. Relay 908 opens the primary winding of transformer 906 and prevents the retransmission of the spacing signal back to relay 1006 which would otherwise respond by going to the spacing condition thus restoring relays 1007 and 1012 to marking and interrupting the break signal from the toll subscriber's station. The receiving amplifier tube 119 at the subscriber's station shown in Fig. 1 responds to the spacing signal and applies the steady spacing signal to selector magnet 123 of the subscriber's printing telegraph receiver so that the printing telegraph receiver will not respond to operation of the transmitting contacts 141 to produce a home record of the signals generated by those contacts and the subscriber, noting this, ceases transmission to permit the remote toll subscriber to gain control of the transmission channel and to send the message for the transmission of which the break signal has been introduced. When the break key 1119 is restored to normal at the toll subscriber's station (Fig. 11) relays 1007 and 1012 return to marking and the toll subscriber may then transmit his message.

As has been described previously, a break signal from the station shown in Fig. 1 is transmitted by the opening of break key 142 which causes the steady transmission of alternating current, which is a spacing signal. If the relays 908 and 917 in the right-hand portion of the cord circuit shown in Fig. 9 should be responding to a spacing signal, at the time that the break signal is received, it will not be applied to the input circuit of tube 911 because the primary winding of transformer 906 is opened at the contacts of relay 908. However, as soon as the relays 908 and 907 go to marking, the break signal of spacing nature from the subscriber's station in Fig. 1 will be effective to operate the relay 916 to the spacing condition, thus opening the circuit through the operating windings of the relays 908, 917, 1003 and 1006. Relay 1003 will go to spacing immediately because current through its biasing winding is not altered by the operation of relay 1007. Relay 1006 will go to spacing as soon as relay 1007 is on marking and puts current through the biasing winding of relay 1006 in the direction to drive its armature to spacing. As soon as the relay 1006 goes to spacing, which operation will occur not later than the stop impulse of a code combination then being transmitted from the toll subscriber's station, at which instant relays 1116 and 1117 will be in the marking condition, a spacing signal will be transmitted to the toll subscriber's station over line conductors 1013 and 1113 which will operate the relay 1112 to its spacing contact. The receiving relay 1112 not only interrupts the circuit of selector magnet 1121, thereby placing it in the spacing condition, but completes a circuit for the energization of the operating windings of relays 1116 and 1117 in shunt relation to the transmitting contacts 1118, such circuit being traced from the negative terminal of rectifier 1111, through the operating windings of relays 1116 and 1117, conductors 1126 and 1127, spacing contact and armature of relay 1112 to ground, returning through ground on the armature of relay 1117 to the marking contact and thence to the positive terminal of rectifier 1111. Thus, further operation of transmitting contacts 1118 will have no control over selector magnet 1121 and the subscriber will recognize this condition as a break signal and will cease operating transmitting contacts 1118 to permit the subscriber at the remote station to transmit signals when such subscriber has terminated the break signal.

Relay 1003 upon going to spacing in response to the break signal, removes ground from the upper terminal of condenser 1031 and permits it to charge from battery through high resistance 1039 for firing discharge tube 1032 after an interval determined by the constants of resistor 1039 and condenser 1031. As is fully disclosed in the Cramer et al. patent, tube 1032 controls a circuit including relay 1004, the function of which is to limit the interval during which a break signal is transmitted by relay 1006 to the toll subscriber's station and to introduce relatively long marking signals intermittently during which the toll subscriber can register a disconnect signal or possibly a recall signal for the purpose of informing the operator at the central office station that a break signal is persisting beyond normal or ordinary break signal intervals which may indicate that a trouble break has occurred and requires attention. The system for limiting the break signal is fully described in the Cramer et al. patent and will not be described in the present specification.

The manner in which a subscriber's station having alternating current signaling facilities registers a disconnect signal at the central office station was described in connection with the description of the system exemplified in Fig. 12 and since it is the same when a station of the type shown in Fig. 1 cooperates with the left-hand portion of the cord circuit shown in Fig. 9, this combination being exemplified in Fig. 16, the description will not be repeated. A toll subscriber initiates a disconnect signal by restoring the power switch 1107 to normal. This disconnects power from motor 1109, from rectifier 1111 and from relay 1103 thus shutting down the station, disconnecting the line conductor 1113 from the winding of receiving relay 1112 and reconnecting it through the ringer 1104 which provides no direct current path to ground. The effect on the toll line termination circuit will be generally the same as that which occurred when the recall key 1101 was opened momentarily, namely, that provided relay 1006 is in the marking condition, relay 1009 will release and since there is no current in the operating winding of relay 1012 to cause its armature to oscillate, relay 1033 will be released which will release relay 1008. This relay connects ground over the ring spring of jack 1001 to relays 936 and 934 and first the relay 936 and then relay 934 will be energized because the ground connection on the ring circuit will not be removed before the relay 934 has an opportunity to be energized. Relay 934 will cause lamp 937 to be illuminated steadily which is an indication to the operator that the toll subscriber has shut down his station and that plug 919 should be removed from jack 1001. Upon the removal of the plug from the jack, relays 901 and 1002 are released. Relay 934 is released by the removal of the plug and lamp 937 is therefore extinguished. Relay 1002 upon being released interrupts the circuit of the operating and biasing windings of relay 1003 and of the operating winding of relay 1006. When the relay 1008 was released, it released the relays 1014 and 1017 and thus the toll line termination circuit is restored to the initial condition.

The manner in which a call from the toll subscriber's station would be initiated will now be described very briefly since a full description is contained in the Cramer et al. patent. The toll subscriber initiates a call by operating power switch 1107 which starts up the station and energizes relay 1103, which disconnects the line conductor 1113 from the ringer 1104 and connects it to the armature of transmitting relay 1116 through receiving relay 1112. Marking current from rectifier 1111 flowing over the line circuit places relays 1007 and 1012 in the marking condition and energizes relay 1009. This relay in turn energizes relay 1033 which energizes relay 1008. Relay 1008 extends the circuit of line conductor 1013 and the operating winding of relays 1007 and 1012 through to the armature of relay 1006 and completes a circuit through the inner upper armature and back contact of relay 1002 to a relay 1046 which becomes energized. Relay 1046 completes the circuit of lamp 1047 and alarm device 1048, the lamp 1047 being individual to jack 1001 and the alarm device 1048 being common to a plurality of toll line termination circuits, and the lighting of lamp 1047 indicates that a call is awaiting on jack 1001. The operator inserts plug 919 into jack 1001 and operates key 9231 to connect the operator's set to the cord circuit shown in Fig. 9 for the purpose of ascertaining by telegraphic communication the identity of the subscriber with which the toll subscriber desires to be connected. The insertion of plug 919 into jack 1001 results in the energization of relay 901 and relay 1002 in series with it, and the relay 1002 extends the toll subscriber's communication circuit through to the tip spring of jack 1001, completes the circuit of biasing winding for relay 1003 and completes energizing circuits for the relays 1014 and 1017 which have been prepared at the lower front contact and armature of relay 1008. The toll line termination circuit is thus placed in the activated condition and the operator, having ascertained the identity of the called station, completes the call by inserting plug 9201 into the proper jack to extend a circuit to the called subscriber, which may be the calling jack of a local subscriber, in which case the operator would actuate ringing key 9202 to ring such subscriber, or which may be the jack of an intertoll trunk circuit, in which case the operator would actuate toll ringing key 9259 for extending a communication circuit to another central office station so as to obtain a connection with a local or toll subscriber of that central office station or to obtain a connection over further intertoll trunk circuits in tandem as exemplified in other embodiments of the invention hereinbefore described.

Although certain specific embodiments of the invention have been shown in the drawings and described in the foregoing specification, it will be understood that the invention is not limited to such specific embodiments but is capable of modification, rearrangement and substitution of parts and elements without departing from the spirit of the invention and within the scope of the appended claims.

What is claimed is:

1. In a telegraph system, a plurality of subscribers' stations, each having a source of oscillatory current and means for keying the output of said source according to telegraph signals to be transmitted, a printing telegraph recorder at each station, means responsive to oscillatory signaling current for controlling said recorder, a telegraph line extending from each station, a central office station at which said lines terminate, a cord circuit at said central office station for interconnecting any two of said subscribers' stations, and an operator's set at said central office station associable with said cord circuit, said operator's set including a source of oscillatory signaling current, means for keying the output of said source according to telegraph signals to be transmitted, a printing telegraph recorder, and means responsive to oscillatory signaling current for controlling said recorder, whereby to afford communication between said operator's set and any of said subscribers' stations by oscillatory signaling current.

2. In a telegraph system, a central office station, a plurality of communication channels radiating from said station, a subscriber's station connected to each of said channels, an operator's set at said telegraph office station including a telegraph transmitter, a telegraph recorder and switching cord circuits, a telegraph transmitter and a telegraph recorder at each subscriber's station, means at said central office station and at each subscriber's station for generating oscillatory signaling currents having identical characteristics, means interconnected between the telegraph transmitter and the communication channel at each subscriber's station and between the telegraph transmitter and the cord circuit at the central office station for modulating the oscillatory signaling current generated by the respective generating means according to telegraph signals, and means interconnected between the communication channel and the telegraph recorder at each subscriber's station and between the cord circuit and the telegraph recorder at said central office station for demodulating telegraph signal modulated oscillatory currents.

3. In a telegraph system, a plurality of subscribers' stations each having a source of oscillatory signaling current, signal receiving means responsive to received and also to locally generated oscillatory signaling current, a set of telegraph signaling contacts, a telegraph line, and means controlled by said contacts for withholding signaling current from said line during idle and marking impulse intervals and for impressing signaling currents on said line during spacing impulse intervals whereby to preclude interference of said source of oscillatory signaling current with received signals, a toll channel for interconnecting any two of said lines, means associated with said channel for amplifying oscillatory signaling current transmitted in either direction through said channel, means associated with said amplifying means for automatically varying the gain thereof inversely to the amplitude of the oscillatory signaling current impressed on said amplifying means, means associated with said channel ahead of said amplifying means for transposing signals originated by said stations to provide oscillatory signaling currents in said channel during idle and marking impulse intervals whereby to estop soaring of the gain of said amplifying means during idle intervals, and means associated with said channel following said amplifying means for retransposing said signals.

4. In a telegraph system, a plurality of subscribers' stations each having a source of oscillatory signaling current, signal receiving means responsive to received and also to locally generated oscillatory signaling current, a set of telegraph signaling contacts, a telegraph line, and means controlled by said contacts for withholding signaling current from said line during idle and marking impulse intervals and for impressing signaling current on said line during spacing impulse intervals whereby to preclude interference of said source of oscillatory signaling current with received signals, a toll channel for interconnecting any two of said lines comprising terminal sections adapted to accommodate transmission in either direction and a pair of intermediate sections each adapted to accommodate transmission in only one direction, means for inductively coupling each of said terminal sections to both of said intermediate sections, means associated with each of said intermediate sections for amplifying oscillatory current transmitted over said section, means associated with said amplifying means for automatically varying the gain thereof inversely to the amplitude of oscillatory signaling current impressed on said amplifying means, means associated with the transmitting end of each of said intermediate sections for transposing signals originated by a connected station to provide oscillatory signaling current in said channel during idle and marking impulse intervals whereby to estop soaring of the gain of said amplifying means during idle intervals, and means associated with the receiving end of each of said intermediate sections for retransposing said signals.

5. In a telegraph system, a two-way regenerative repeater having two line connection terminals each adapted to serve as signal output terminal when the other serves as signal input terminal, a multiple bank stepping switch having certain of its contactors connected to said line connection terminals, a plurality of pairs of jacks each pair adapted to appear at one of a plurality of operators' positions and having its line connection terminals connected to corresponding contacts of the stepping switch banks the contactors of which are connected to the line connection terminals of said repeater, means for advancing the contactors of said switch in step-by-step manner, means controlled by one jack of each of said pairs upon insertion of a cord plug for setting said contactor advancing means in operation, and means also controlled by said one jack of each pair for terminating the operation of said contactor advancing means when said contactors reach the bank contacts to which the line connection terminals of said pair of jacks are connected whereby to extend the circuits of the line connection terminals of said repeater to said pair of jacks.

6. A telegraph system including a channel of telegraphic transmission extending from an outlying station to a central office, means at the outlying station for impressing upon said channel coded groups of alternating current impulses, a cord circuit at said central office, terminals of said channel and terminals of said cord circuit adapted for interconnection to convey said alternating current into the cord circuit, a monitoring telegraph machine associable with said cord circuit, means for associating said machine, and means for operating said machine by and in accordance with said code groups.

7. A telegraph system including a channel of telegraphic transmission extending from an outlying station to a central office, means at said outlying station for impressing upon said channel coded groups of alternating current impulses, a cord circuit at said central office, terminals of said channel and terminals of said cord circuit adapted for interconnection to convey said alternating current impulses into said cord circuit, a monitoring telegraph machine associable with said cord circuit, means for associating said machine with said cord circuit, means for operating said machine by and in accordance with said coded groups of impulses, and means associated with said machine for impressing coded groups of alternating current on said cord circuit for transmission over said channel to said outlying station.

8. A telegraph system including a plurality of channels of telegraphic transmission extending from outlying stations to a central office, means at said outlying stations for impressing upon said channels coded groups of alternating current impulses, a cord circuit at said central office, terminals for said channels and terminals for said cord circuit adapted to interconnect any two of said channels to convey alternating current impulses through said cord circuit from either of said channels to the other, a monitoring telegraph machine associable with said cor circuit, means for associating said machine with said cord circuit, and means associated with said machine for impressing coded groups of alternating current impulses on said cord circuit for transmission over said interconnected channels.

9. A telegraph system including a plurality of channels of telegraphic transmission extending from outlying stations to a central office, means at said outlying stations for impressing upon said channels coded groups of alternating current impulses, a cord circuit at said central office, terminals for said channels and terminals for said cord circuit adapted to interconnect any two of said channels to convey alternating current impulses through said cord circuit from either of said channels to the other, a monitoring telegraph machine associable with said cord circuit, means for associating said machine with said cord circuit, means associated with said machine for impressing coded groups of alternating current impulses on said cord circuit for transmission over said interconnected channels, and means for dividing said cord circuit at either of two points to provide communicative relation of said central office telegraph machine and alternating current impulse impressing means with either of said channels exclusively.

10. A telegraph system including at least two central office stations, a trunk circuit interconnecting said stations, a cord circuit connectable to said trunk circuit, an operator's telegraph set associable with said cord circuit including means for transmitting and receiving groups of alternating current impulses representing intelligence signals and supervisory signals, means for allotting different intervals of duration to different ones of said supervisory signals, means associated with said trunk circuit for rectifying said signals to derive direct current impulses therefrom, means for distinguishing between direct current impulses representing intelligence signals and supervisory signals on a time basis, further means for distinguishing between different ones of said supervisory signals on a time basis, and means for producing distinctive indications representative of said different supervisory signals.

11. A telegraph system including at least two central office stations, a trunk circuit interconnecting said stations, a cord circuit connectable to said trunk circuit at each station, an operator's telegraph set associable with each of said cord circuits including means for transmitting and receiving groups of alternating current impulses representing intelligence signals and also including means for transmitting alternating current impulses of like character but different duration representing call, recall and disconnect signals, means associated with said trunk circuit for rectifying all of said signals to derive direct current impulses therefrom, means at each end of said trunk circuit and responsive only to signals received from the opposite end thereof for distinguishing on a time basis between direct current impulses representing intelligence signals as a class and call, recall and disconnect signals as a class, further means for distinguishing on a time basis among said call, recall and disconnect signals, and means for producing distinctive indications representing said call, recall and disconnect signals.

12. A telegraph system including an outlying station, means thereat for transmitting and receiving coded groups of alternating current impulses, a second outlying station, means thereat for transmitting and receiving coded groups of direct current impulses, a central office station, a telegraph line extending between each of said outlying stations and said central office station, a cord circuit adapted to interconnect said lines, an operator's set associable with said cord circuit and including means for transmitting and receiving coded groups of alternating current impulses, and means in said cord circuit and available alike to said stations and said operator's set for converting to direct current impulses all signals directed to said second outlying station and for converting to alternating current impulses all signals received from said second outlying station.

13. A telegraph system including an outlying station, means thereat for transmitting and receiving coded groups of alternating current impulses, a second outlying station, means thereat for transmitting and receiving coded groups of direct current impulses, a central office station, a telegraph line extending between said outlying stations and said central office station, a cord circuit adapted to interconnect said lines, an operator's set associable with said cord circuit and including means for transmitting and receiving coded groups of alternating current impulses, and signal converting means in said cord circuit and available alike to said stations and said operator's set comprising means for rectifying said alternating current impulses, means controlled by said rectifying means for transmitting direct current impulses to said second outlying station, a source of alternating current, and means responsive to direct current impulses received from said second outlying station for keying said source to produce alternating current impulses.

LELAND C. ROBERTS.

REFERENCES CITED

The following references are of record in the file of this patent:

UNITED STATES PATENTS

| Number | Name | Date |
|---|---|---|
| 896,103 | Goodrum | Aug. 18, 1908 |
| 1,521,671 | Deardorff | Jan. 6, 1925 |
| 1,521,685 | Hamilton | Jan. 6, 1925 |
| 1,625,495 | O'Neill | Apr. 19, 1927 |
| 1,779,495 | Roberts | Oct. 28, 1930 |
| 1,937,640 | Clarke | Dec. 5, 1933 |
| 1,958,930 | Singer | May 14, 1934 |
| 2,093,080 | Hysko | Sept. 14, 1937 |
| 2,106,352 | Kinkead | Jan. 25, 1938 |
| 2,143,000 | Cramer | Jan. 10, 1939 |
| 2,173,551 | Fitch | Sept. 19, 1939 |
| 2,190,540 | Desmond | Feb. 13, 1940 |
| 2,209,327 | D'Humy | July 30, 1940 |
| 2,314,422 | Phelps | Mar. 23, 1943 |

OTHER REFERENCES

Automatic Telephony, by Smith and Campbell. Fig. 197 or 198 (2d ed., 1921).